(12) United States Patent
Kato et al.

(10) Patent No.: US 11,191,039 B2
(45) Date of Patent: Nov. 30, 2021

(54) WIRELESS SYSTEM CAPABLE OF USING SHARED FREQUENCY, RADIO RESOURCE ALLOCATION METHOD IN WIRELESS COMMUNICATION USING SHARED FREQUENCY, AND BASE STATION

(71) Applicant: Panasonic Intellectual Property Management Co., Ltd., Osaka (JP)

(72) Inventors: Osamu Kato, Fukuoka (JP); Hideki Kanemoto, Kanagawa (JP); Hiroaki Asano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 261 days.

(21) Appl. No.: 16/582,736

(22) Filed: Sep. 25, 2019

(65) Prior Publication Data
US 2020/0344701 A1 Oct. 29, 2020

(30) Foreign Application Priority Data

Apr. 26, 2019 (JP) .............................. JP2019-086300
Jun. 5, 2019 (JP) .............................. JP2019-105624

(51) Int. Cl.
*H04W 52/26* (2009.01)
*H04W 72/08* (2009.01)

(52) U.S. Cl.
CPC ....... *H04W 52/267* (2013.01); *H04W 72/085* (2013.01)

(58) Field of Classification Search
CPC . H04B 7/0617; H04B 7/0626; H04W 52/243; H04W 52/244; H04W 52/267;
(Continued)

(56) References Cited

U.S. PATENT DOCUMENTS 8,682,334 B2 * 3/2014 Nishimura ............. H04B 17/18
455/446
9,055,538 B2 * 6/2015 Yamazaki ........... H04W 52/243
(Continued)

OTHER PUBLICATIONS

Fujii et al., "Smart Spectrum for FutureWirelessWorld," *IEICE Trans. Commun.*, E100-B(9), Sep. 2017, 13pages.
(Continued)

*Primary Examiner* — Thomas R Cairns
(74) *Attorney, Agent, or Firm* — Seed IP Law Group LLP

(57) ABSTRACT

A wireless system can use a shared frequency mainly used by an existing first wireless system under predetermined sharing conditions, and includes a communication unit performing wireless communication with a terminal accommodated in a communication area, at least one sensor disposed around the communication area and measuring reception power of a signal sent from the inside of the communication area via the communication unit, a memory storing beam data indicating a correspondence relationship between a beam direction of the signal and a measurement result in the sensor, a determination unit determining allowable maximum transmission power of the signal in each beam direction on the basis of the sharing conditions and the beam data, and an allocation unit allocating a radio resource to the terminal on the basis of the allowable maximum transmission power in each beam direction and channel state information reported from the terminal.

7 Claims, 14 Drawing Sheets

(58) Field of Classification Search
CPC .. H04W 52/367; H04W 52/40; H04W 72/085
See application file for complete search history.

(56) References Cited

U.S. PATENT DOCUMENTS

| | | | | |
|---|---|---|---|---|
| 10,425,822 B2* | 9/2019 | Yang | ...................... | H04W 24/10 |
| 10,656,281 B2* | 5/2020 | Hamzeh | ............... | H04J 11/0073 |
| 10,820,329 B2* | 10/2020 | Willis, III | ........... | H04W 72/085 |

OTHER PUBLICATIONS

Yamashita et al., "Wireless QoS Control Technologies," NTT Technical Review, Jul. 2014, 14 pages.

* cited by examiner

FIG. 8

| BEAM DIRECTION | RECEPTION POWER IN RADIO WAVE SENSOR (WS1) | ... | RECEPTION POWER IN RADIO WAVE SENSOR (WS5) |
|---|---|---|---|
| ...... | ...... | ...... | ...... |
| #i | RP11 | ...... | RP51 |
| #(i+1) | RP12 | ...... | RP52 |
| ... | ... | ... | ... |

TBL1

FIG. 11
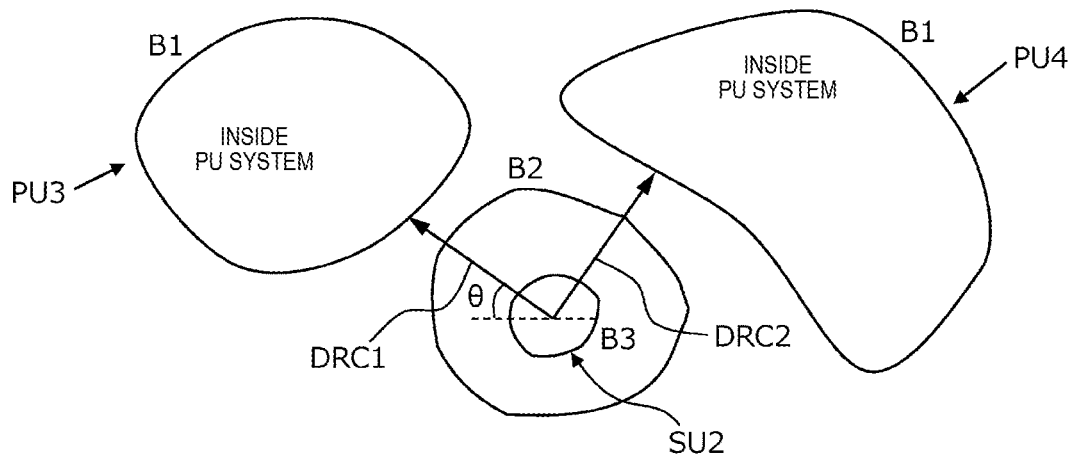
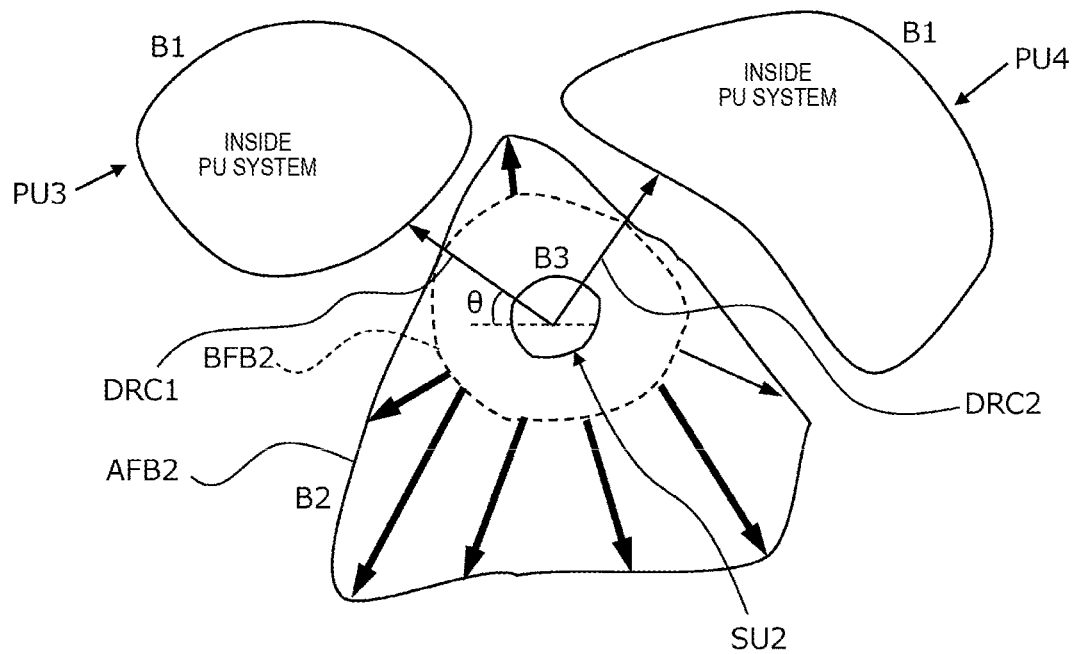

WIRELESS SYSTEM CAPABLE OF USING SHARED FREQUENCY, RADIO RESOURCE ALLOCATION METHOD IN WIRELESS COMMUNICATION USING SHARED FREQUENCY, AND BASE STATION

BACKGROUND

1. Technical Field

The present disclosure relates to a wireless system capable of using a shared frequency, a radio resource allocation method in wireless communication using a shared frequency, and a base station.

2. Description of the Related Art

Sharing a specific frequency band substantially exclusively used by an existing wireless system hitherto between the existing wireless system (refer to a PU system which will be described later) and another wireless system (refer to a SU system which will be described later) other than the existing wireless system under predetermined conditions contributes to effective use of a frequency. Thus, in recent years, a communication standard for the fifth generation mobile communication system (5G) has been examined, and a frequency band supposed to be used in the 5G has been examined to be shared between an existing wireless system and a new wireless system (that is, another wireless system other than the existing wireless system). In other words, a frequency band that is substantially exclusively used in the existing wireless system has been prompted to be partially selected in the new wireless system, and thus a structure for increasing the use efficiency of a frequency as a whole has been examined. In the following specification, the existing wireless system will be referred to as a "primary user (PU) system", and the new wireless system will be referred to as a "secondary user (SU) system". Regarding a frequency sharing condition, there may be a condition in which the PU system is not influenced by interference due to the use of a frequency in the SU system.

In order to satisfy this condition, a method is disclosed in which a third-party shared frequency management organization performs interference computation due to frequency sharing on the basis of position information of each of a wireless device of the PU system and a wireless device of the SU system (refer to FIG. 10), determines a condition for permitting the SU system to use a frequency on the basis of the computation result, and notifies the SU system of the condition (for example, refer to Takeo FUJII et al., "Smart Spectrum for Future Wireless World", The Institute of Electronics, Information and Communication Engineers, IEICE TRANS. COMMUN., VOL. E100-B, NO. 9 Sep. 2017).

SUMMARY

Wireless parameters given for the use permission may include, for example, a carrier frequency, a wireless bandwidth, transmission power, and a transmission directivity gain. Thus, an upper limit of a value of transmission power including a transmission directivity gain for a SU system in a direction in which a border of an allowable interference level is closest to the SU system may be defined such that the allowable interference level in a PU system is the minimum, and a frequency use permission may be given to the SU system such that the upper limit is not exceeded. Here, the direction of being closest is not limited to the concept of merely being geographically close, and may include the concept that the extent of interference due to radiation of a radio wave from the SU system is small.

However, in the use permission method, in radio resource control during the use of a radio wave in the SU system, an upper limit of a value of transmission power including a transmission directivity gain in a direction in which interference given from the SU system has the greatest influence on the PU system is equally applied to all directions of 360 degrees when viewed from the SU system. Therefore, for example, in a case where there is a direction in which interference given from the SU system does not have the great influence on the PU system, the use of transmission power exceeding the upper limit of a value of the transmission power including a transmission directivity gain is not permitted, and this may restrict a frequency effective use in the SU system.

The present disclosure has been devised in consideration of the circumstances of the related art, and an object thereof is to provide a wireless system capable of using a shared frequency, a radio resource allocation method in wireless communication using a shared frequency, and a base station, capable of suppressing a reduction of use efficiency of a shared frequency by adaptively controlling transmission power according to a direction of wireless communication when at least some shared frequencies preferentially usable by a PU system are used by a SU system.

According to the present disclosure, there is provided a wireless system capable of using a shared frequency mainly used by an existing first wireless system under predetermined sharing conditions, the wireless system including a communication unit that performs wireless communication with at least one terminal accommodated in a communication area of the wireless system; at least one sensor that is disposed around the communication area and measures reception power of a signal sent from the inside of the communication area via the communication unit; a memory that stores beam data indicating a correspondence relationship between a beam direction of the signal and a measurement result in the sensor; a determination unit that determines allowable maximum transmission power of the signal in each beam direction on the basis of the sharing conditions and the beam data; and an allocation unit that allocates a radio resource to the terminal on the basis of the allowable maximum transmission power in each beam direction and channel state information reported from the terminal.

According to the present disclosure, there is provided a radio resource allocation method in wireless communication of a wireless system capable of using a shared frequency mainly used by an existing first wireless system under predetermined sharing conditions, the method including performing wireless communication with at least one terminal accommodated in a communication area of the wireless system; causing at least one sensor disposed around the communication area to measure reception power of a signal sent from the inside of the communication area via the communication unit; storing, into a memory, beam data indicating a correspondence relationship between a beam direction of the signal and a measurement result in the sensor; determining allowable maximum transmission power of the signal in each beam direction on the basis of the sharing conditions and the beam data; and allocating a radio resource to the terminal on the basis of the allowable maximum transmission power in each beam direction and channel state information reported from the terminal.

According to the present disclosure, there is provided a base station in a wireless system capable of using a shared frequency mainly used by an existing first wireless system under predetermined sharing conditions, the base station including a communication unit that performs wireless communication with at least one terminal accommodated in a communication area of the wireless system; a memory that stores beam data indicating a correspondence relationship between a measurement result of reception power of a signal sent from the inside of the communication area via the communication unit by at least one sensor disposed around the communication area and a beam direction of the signal; a determination unit that determines allowable maximum transmission power of the signal in each beam direction on the basis of the sharing conditions and the beam data; and an allocation unit that allocates a radio resource to the terminal on the basis of the allowable maximum transmission power in each beam direction and channel state information reported from the terminal.

According to the present disclosure, there is provided a wireless system capable of using a shared frequency mainly used by an existing first wireless system under predetermined sharing conditions, the wireless system including a communication unit that performs wireless communication with at least one terminal accommodated in a communication area of the wireless system; an acquisition unit that acquires information regarding a reception sensitivity border of the first wireless system; a direction determination unit that derives a transmission direction of a signal in which a distance from the communication area of the wireless system to the reception sensitivity border of the first wireless system is the minimum by using the information regarding the reception sensitivity border of the first wireless system; a power determination unit that derives allowable maximum transmission power of the signal in the derived transmission direction of the signal; and an allocation unit that allocates a radio resource to the terminal on the basis of the allowable maximum transmission power and channel state information reported from the terminal.

According to the present disclosure, there is provided a wireless system capable of using a shared frequency mainly used by an existing first wireless system under predetermined sharing conditions, the wireless system including a communication unit that performs wireless communication with at least one terminal accommodated in a communication area of the wireless system; an acquisition unit that acquires sharing conditions including allowable transmission power of a signal calculated to the extent of avoiding interference with the first wireless system from a shared frequency management apparatus connected to the first wireless system; a direction determination unit that derives a transmission direction of the signal in which a distance from the communication area of the wireless system to a reception sensitivity border of the first wireless system is the minimum by using the sharing conditions; a deriving unit that derives a difference between allowable maximum transmission power of the signal in the derived transmission direction of the signal and allowable transmission power of the signal; and an allocation unit that allocates a radio resource to the terminal on the basis of the difference and channel state information reported from the terminal.

According to the present disclosure, there is provided a radio resource allocation method in wireless communication of a wireless system capable of using a shared frequency mainly used by an existing first wireless system under predetermined sharing conditions, the method including performing wireless communication with at least one terminal accommodated in a communication area of the wireless system; acquiring information regarding a reception sensitivity border of the first wireless system; deriving a transmission direction of a signal in which a distance from the communication area of the wireless system to the reception sensitivity border of the first wireless system is the minimum by using the information regarding the reception sensitivity border of the first wireless system; deriving allowable maximum transmission power of the signal in the derived transmission direction of the signal; and allocating a radio resource to the terminal on the basis of the allowable maximum transmission power and channel state information reported from the terminal.

According to the present disclosure, there is provided a base station in a wireless system capable of using a shared frequency mainly used by an existing first wireless system under predetermined sharing conditions, the base station including a communication unit that performs wireless communication with at least one terminal accommodated in a communication area of the wireless system; an acquisition unit that acquires information regarding a reception sensitivity border of the first wireless system; a direction determination unit that derives a transmission direction of a signal in which a distance from the communication area of the wireless system to the reception sensitivity border of the first wireless system is the minimum by using the information regarding the reception sensitivity border of the first wireless system; a power determination unit that derives allowable maximum transmission power of the signal in the derived transmission direction of the signal; and an allocation unit that allocates a radio resource to the terminal on the basis of the allowable maximum transmission power and channel state information reported from the terminal.

According to the present disclosure, there is provided a radio resource allocation method in wireless communication of a wireless system capable of using a shared frequency mainly used by an existing first wireless system under predetermined sharing conditions, the method including performing wireless communication with at least one terminal accommodated in a communication area of the wireless system; acquiring sharing conditions including allowable transmission power of a signal calculated to the extent of avoiding interference with the first wireless system from a shared frequency management apparatus connected to the first wireless system; deriving a transmission direction of the signal in which a distance from the communication area of the wireless system to a reception sensitivity border of the first wireless system is the minimum by using the sharing conditions; deriving a difference between allowable maximum transmission power of the signal in the derived transmission direction of the signal and the allowable transmission power of the signal; and allocating a radio resource to the terminal on the basis of the difference and channel state information reported from the terminal.

According to the present disclosure, there is provided a base station in a wireless system capable of using a shared frequency mainly used by an existing first wireless system under predetermined sharing conditions, the base station including a communication unit that performs wireless communication with at least one terminal accommodated in a communication area of the wireless system; an acquisition unit that acquires sharing conditions including allowable transmission power of a signal calculated to the extent of avoiding interference with the first wireless system from a shared frequency management apparatus connected to the first wireless system; a direction determination unit that derives a transmission direction of the signal in which a distance from the communication area of the wireless system to a reception sensitivity border of the first wireless system is the minimum by using the sharing conditions; a deriving unit that derives a difference between allowable maximum transmission power of the signal in the derived transmission direction of the signal and the allowable transmission power of the signal; and an allocation unit that allocates a radio resource to the terminal on the basis of the difference and channel state information reported from the terminal.

According to the present disclosure, it is possible to suppress a reduction of use efficiency of a shared frequency by adaptively controlling transmission power according to a direction of wireless communication when at least some shared frequencies preferentially usable by a PU system are used by a SU system.

BRIEF DESCRIPTION OF THE DRAWINGS

FIG. 8 is a table illustrating an example of reception power in a radio wave sensor in each beam direction, previously measured before an actual operation;

FIG. 11 is a diagram schematically illustrating a disposition example of a SU system and two PU systems on the periphery thereof according to Exemplary Embodiment 3;

DETAILED DESCRIPTION

Figure 10:
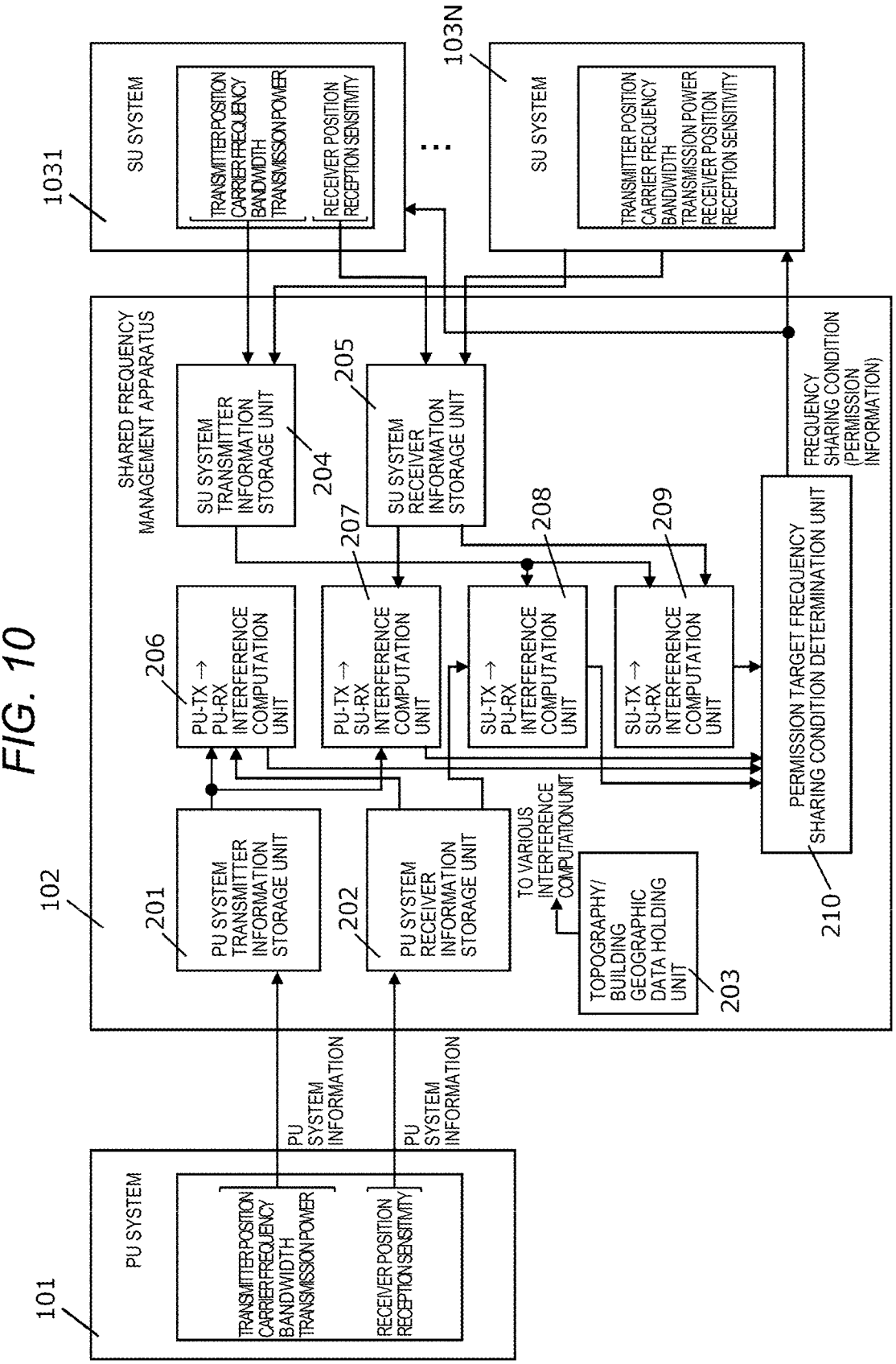
FIG. 10 is a configuration diagram illustrating a shared frequency management system of the related art.

Details leading to contents of Exemplary Embodiment 1 First, as the related art that is a basis of a wireless system capable of using a shared frequency according to the present disclosure, the concept of shared frequency management will be described with reference to FIG. 10. FIG. 10 is a configuration diagram illustrating a shared frequency management system of the related art.

A shared frequency management system illustrated in FIG. 10 is configured to include PU system 101, shared frequency management apparatus 102, and a plurality of (for example, N: an integer of 2 or greater) SU systems 1031, . . . , and 103N. PU system 101 and shared frequency management apparatus 102 can perform transmission and reception of data or information therebetween. Similarly, shared frequency management apparatus 102 and each of SU systems 1031 to 103N can perform transmission and reception of data or information therebetween.

PU system 101 is a wireless system that is controlled to be operated by a system operator (a so-called primary user) to whom a frequency of a predetermined shared frequency band is allocated to be mainly or substantially exclusively used. PU system 101 has one or more transmitters (not illustrated) and receivers (not illustrated) required to operate PU system 101, and holds PU system information required to operate PU system 101. Here, the PU system information includes information regarding transmission such as a transmitter position, a carrier frequency (center frequency), a bandwidth, and transmission power, and information regarding reception such as a receiver position and a reception sensitivity.

Shared frequency management apparatus 102 is configured to include PU system transmitter information storage unit 201, PU system receiver information storage unit 202, topographic/building/geographic data holding unit 203, SU system transmitter information storage unit 204, SU system receiver information storage unit 205, PU-TX→PU-RX interference computation unit 206, PU-TX→SU-RX interference computation unit 207, SU-TX→PU-RX interference computation unit 208, SU-TX→SU-RX interference computation unit 209, and permission target frequency sharing condition determination unit 210.

Each of SU systems 1031 to 103N is a wireless system that applies to shared frequency management apparatus 102 for conditional use of some frequencies of a predetermined shared frequency band that is mainly or exclusively usable by PU system 101. Each of SU systems 1031 to 103N has one or more transmitters (not illustrated) and receivers (not illustrated) required to operate SU systems 1031 to 103N, and holds SU system information required to operate SU systems 1031 to 103N. Here, the SU system information includes information regarding transmission such as a transmitter position, a carrier frequency (center frequency), a bandwidth, and transmission power, and information regarding reception such as a receiver position and a reception sensitivity.

In the related art illustrated in FIG. 10, shared frequency management apparatus 102 preserves information regarding the transmitter of the PU system from PU system 101 in PU system transmitter information storage unit 201, and preserves information regarding the receiver of the PU system from PU system 101 in PU system receiver information storage unit 202. Similarly, shared frequency management apparatus 102 preserves information regarding the transmitter of the SU system from each of SU systems 1031 to 103N in SU system transmitter information storage unit 204, and preserves information regarding the receiver of the SU system from each of SU systems 1031 to 103N in SU system receiver information storage unit 205. Shared frequency management apparatus 102 reads geographic information from topographic/building/geographic data holding unit 203, and performs various interference computations by using the geographic information in PU-TX→PU-RX interference computation unit 206, PU-TX→SU-RX interference computation unit 207, SU-TX→PU-RX interference computation unit 208, and SU-TX→SU-RX interference computation unit 209.

For example, PU-TX→PU-RX interference computation unit 206 performs interference computation in a signal propagation path from the transmitter of PU system 101 to the receiver of PU system 101. Similarly, PU-TX→SU-RX interference computation unit 207 performs interference computation in a signal propagation path from the transmitter of PU system 101 to the receiver of each of SU systems 1031 to 103N. Similarly, SU-TX→PU-RX interference computation unit 208 performs interference computation in a signal propagation path from the transmitter of each of SU systems 1031 to 103N to the receiver of PU system 101. Similarly, SU-TX→SU-RX interference computation unit 209 performs interference computation in a signal propagation path from the transmitter of each of SU systems 1031 to 103N to the receiver of each of SU systems 1031 to 103N.

Permission target frequency sharing condition determination unit 210 notifies each SU system of a frequency sharing condition (permission information) regarding use of a frequency of a shared frequency band usable by each of SU systems 1031 to 103N on the basis of enormous results of the various interference computations.

In the related art, an interference computation amount between a wireless device (for example, the transmitter or the receiver; the same applies hereafter) of PU system 101 and a wireless device (for example, the transmitter or the receiver; the same applies hereafter) of each of SU systems 1031 to 103N becomes enormous, and thus a considerably high load is applied to shared frequency management apparatus 102 in a computation process. In order to obtain an interference amount by reducing an error with actual measurement, it is necessary to take into consideration the presence of a building between the wireless device of PU system 101 and the wireless device of each of SU systems 1031 to 103N or a peripheral building, but interference computation is further enormous in a case where the presence of a building or the like is taken into consideration, and thus this is not realistic. On the other hand, in order not to underestimate an interference amount from the wireless device of each of SU systems 1031 to 103N to the wireless device of PU system 101 by not taking into consideration the presence of a building or the like, a radio wave path between the wireless devices may be predicted and assumed to be a propagation path (that is, free space propagation), and interference computation may be performed. In this method, each of SU systems 1031 to 103N is required to be present at a position considerably far away from PU system 101, and thus the extent of efficient frequency use through frequency sharing that is an original purpose is reduced. When a condition for permitting each of SU systems 1031 to 103N to use a shared frequency is determined in order to avoid interference among a plurality of SU systems present nearby, there is a high probability that a frequency permitted to be used by each of SU systems 1031 to 103N may be finely divided, and thus a division loss occurs regardless of an actual operation of using the permitted frequency in each of SU systems 1031 to 103N. Thus, the extent of efficient frequency use through frequency sharing that is an original purpose is also reduced due to the division loss.

Therefore, in Exemplary Embodiment 1, a description will be made of examples of a shared frequency management system and a shared frequency management method capable of easily managing permission of an SU system's use of at least a part of a shared frequency preferentially usable by a PU system without requiring complicated interference computation, and thus suppressing a reduction in use efficiency of the shared frequency.

Hereinafter, a detailed description will be made of exemplary embodiments in which a shared frequency management system and a shared frequency management method according to the present disclosure are specifically disclosed with reference to the drawings as appropriate. However, a detailed description more than necessary may be omitted. For example, a detailed description of a well-known content or a repeated description of a substantially identical configuration may be omitted. This is for a person skilled in the art's better understanding by avoiding unnecessary redundancy in the following description. The accompanying drawings and the following description are provided for a person skilled in the art to fully understand the present disclosure, and are not intended to limit the subject disclosed in the claims.

Exemplary Embodiment 1

Hereinafter, a frequency band (hereinafter, referred to as a "shared frequency band") of which a frequency is shared by the shared frequency management system is set to a frequency of 20 GHz or higher, and, for example, the 25 GHz to 27 GHz band that is a high frequency band allocated to fixed wireless access (FWA) systems of which the number is only several thousands in Japan or the 27 GHz to 29.5 GHz band that is a high frequency band allocated to fixed satellite telecommunication services will be exemplified. Such frequencies have characteristics that a radio wave arrival distance is a small distance of, for example, about 100 m, and it is difficult for a radio wave to be diffracted by or transmitted through a shield such as a building. The shared frequency band is supposed to be used in the fifth generation mobile communication system (5G) at present, and may be a frequency band suitable for wireless communication in a communication area of an SU system (for example, a site of the SU system) operated by a secondary user who is a subsequent user. For example, in a fixed wireless access system in the 26 GHz band, a bandwidth (BW) is 60 MHz, and there are 26 carrier frequencies. In this case, k indicating an ordinal number of a carrier frequency $f_k$ is any one of integer values of 1 to 26.

In the following exemplary embodiment, the shared frequency management system recognizes a reception power distribution of a wireless signal in each time period and each location based on transmission power of a PU system. A limitation to be observed in the use of a shared frequency is that transmission power of an SU system does not give interference of a reception sensitivity or more of a PU system to the inside of a border (a first border; refer to FIG. 1) at which reception power of a transmitted wireless signal becomes the reception sensitivity of the PU system. The first border will be described later in detail, and differs for each carrier frequency $f_k$.

Figure 1:
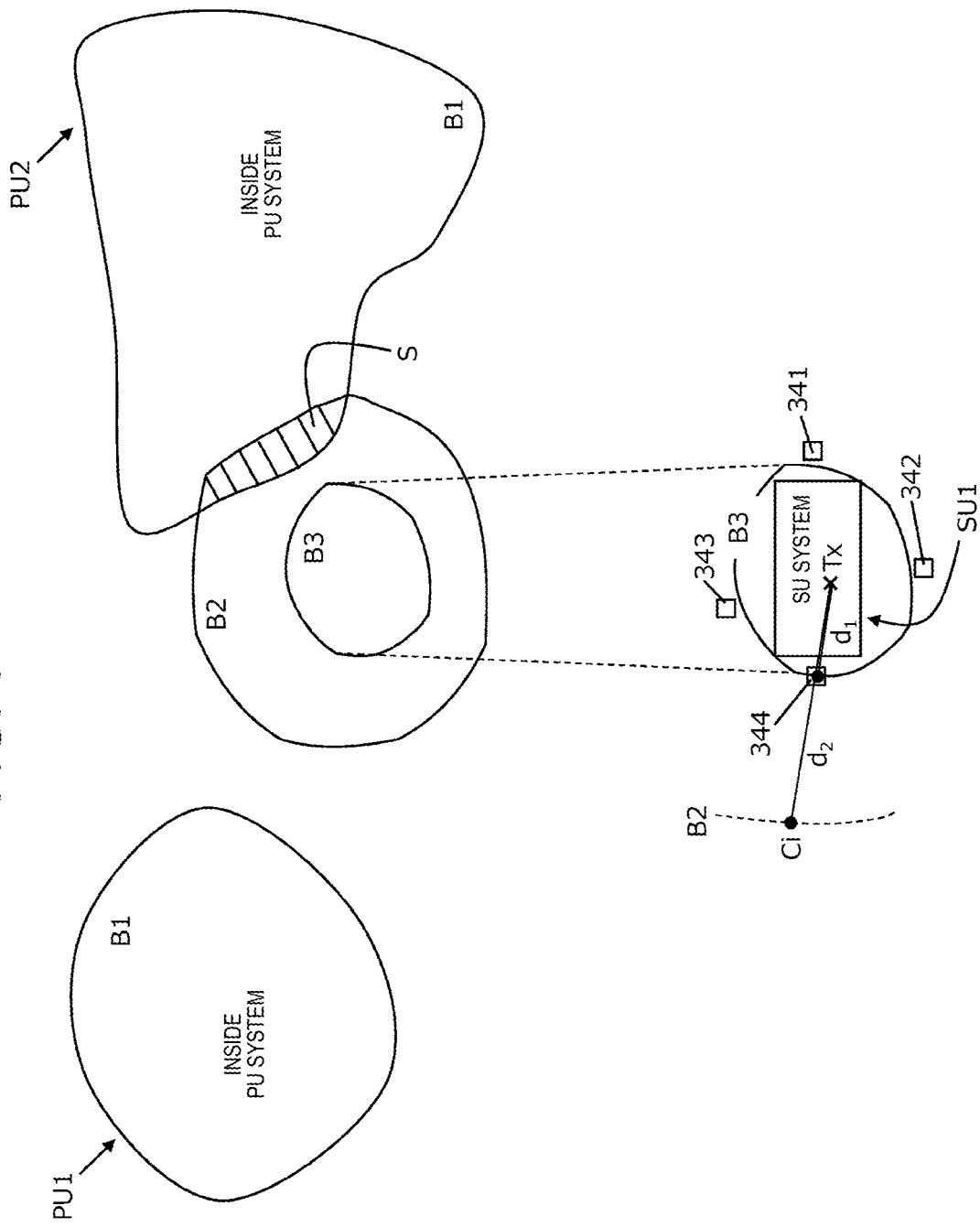
FIG. 1 is a diagram illustrating concepts of a first border, a second border, and a third border.

For example, in an SU system scheduled to use a frequency of the 26 GHz band indoors or within a site, an area in which a transmitter and a receiver (including an access point) capable of performing wireless communication coping with the SU system can be present is a default restricted area in which a wireless service of the SU system is received (a third border; refer to FIG. 1). The restricted area is, for example, a company site, a university campus, a hospital, an amusement park, a factory, a construction site, a station, or a smart town where hundreds of households live, which are only examples, and is not limited thereto. Details of the third border will be described later, and the third border indicates a border line of a restricted area (that is, a closed space area) in which a wireless service of an SU system is received.

Therefore, the shared frequency management system builds reception power of a wireless signal in each time period and each location based on transmission power of an SU system present inside the third border, as a database by using measurement results in one or more radio wave sensors (refer to FIG. 1) provided in the periphery of the closed space area of the SU system, and can thus determine the presence or absence of a frequency of a shared frequency band that can be permitted to be used by the SU system through computation. The radio wave sensors are preferably disposed near the third border. In the computation, the shared frequency management system can perform efficient computation by recognizing a border (a second border; refer to FIG. 1) of a position where the reception power of the wireless signal in each time period and each location based on the transmission power of the SU system becomes a reception sensitivity of a PU system. In other words, in Exemplary Embodiment 1, the concepts of the first border, the second border, and the third border are introduced, and thus a determination of whether or not some frequencies of a shared frequency band allocated to be mainly or substantially exclusively usable by a PU system may be permitted to be used by an SU system can be more easily performed than in the related art.

FIG. 1 is a diagram illustrating the concepts of first border B1, second border B2, and third border B3. In FIG. 1, for better understanding of description, two PU systems PU1 and PU2 are illustrated, but, in Exemplary Embodiment 1, the number of PU systems is not limited to two.

First, first border B1 will be described.

The shared frequency management system according to Exemplary Embodiment 1 normally recognizes a plurality of reception point positions where reception power of a wireless signal (an example of a first wireless signal) transmitted from a transmitter of each of PU systems PU1 and PU2 becomes a reception sensitivity on the basis of information (for example, a transmission point position, a carrier frequency ($f_k$) or a carrier frequency ($f_k$) number, a bandwidth, and transmission power including a transmission directivity gain) regarding a wireless method used in each of PU systems PU1 and PU2 illustrated in FIG. 1. Here, the reception sensitivity (an example of a defined value) is the minimum reception power with which wireless communication is established, and is as follows. In a case where a wireless signal with the carrier frequency $f_k$ is transmitted from a PU system, a border line connecting the plurality of adjacent reception point positions to each other is referred to as the "first border", and is indicated by "$B1(f_k)$" in some cases.

Next, second border B2 will be described.

The shared frequency management system according to Exemplary Embodiment 1 normally recognizes a plurality of reception point positions where reception power of a wireless signal (an example of a second wireless signal) transmitted from transmitter Tx of SU system SU1 becomes a reception sensitivity of a PU system (for example, PU system PU2) on the basis of information (for example, restricted area position information, a carrier frequency ($f_k$) or a carrier frequency ($f_k$) number, a bandwidth, transmission power including a transmission directivity gain, and reception power measured by a radio wave sensor which will be described later) regarding a wireless method scheduled to be used in SU system SU1. In a case where a wireless signal with carrier frequency $f_k$ is transmitted from SU system SU1, a border line connecting the plurality of adjacent reception point positions to each other is referred to as the "second border", and is indicated by "$B2(f_k)$" in some cases. Here, a propagation distance of a radio wave from transmitter Tx of SU system SU1 to reception point position Ci described above is indicated by "$d_2$".

In FIG. 1, overlapping intersection area S is present between a region surrounded by second border B2 and a region surrounded by first border B1 corresponding to PU system PU2, but intersection area S is not present between the region surrounded by second border B2 and a region surrounded by first border B1 corresponding to PU system PU1.

Finally, third border B3 will be described.

Third border B3 is a border line of a restricted area (for example, the exemplified university campus) in which a wireless service of SU system SU1 is received. In Exemplary Embodiment 1, one or more radio wave sensors 341, 342, 343, and 344 are disposed around third border B3. Each of radio wave sensors 341 to 344 measures reception power of a wireless signal based on transmission power from transmitter Tx of SU system SU1, and reports the measured reception power to SU system SU1. Each of radio wave sensors 341 to 344 monitors whether or not actual reception power of a wireless signal using carrier frequency $f_k$ permitted to be used in SU system SU1 complies with reception power defined in a shared frequency use permission condition. Here, a propagation distance of a radio wave from transmitter Tx of SU system SU1 to a radio wave sensor (for example, radio wave sensor 344) is indicated by "$d_1$". Propagation distance "$d_1$" which will be described later in detail is used for computation of propagation distance "$d_2$" corresponding to second border B2.

Figure 2:
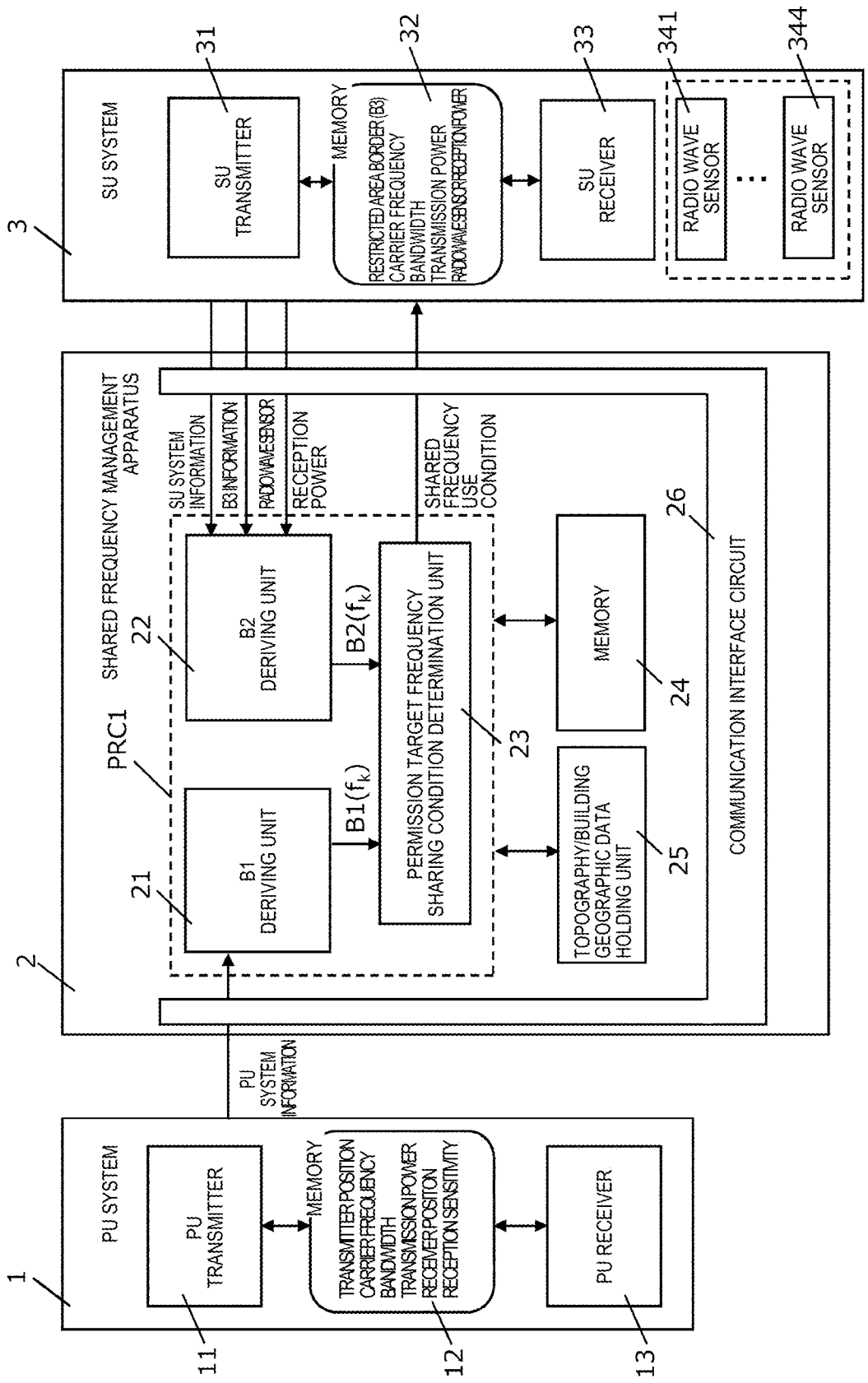
FIG. 2 is a block diagram illustrating an internal configuration example of a shared frequency management system according to Exemplary Embodiment 1.

Next, with reference to FIG. 2, a configuration example of the shared frequency management system according to Exemplary Embodiment 1 will be described. FIG. 2 is a block diagram illustrating an internal configuration example of the shared frequency management system according to Exemplary Embodiment 1. The shared frequency management system according to Exemplary Embodiment 1 is configured to include PU system 1, shared frequency management apparatus 2, SU system 3, and one or more radio wave sensors 341 to 344 (refer to FIG. 1). Each of radio wave sensors 341 to 344 may be included in SU system 3. PU system 1 and shared frequency management apparatus 2 can perform transmission and reception of data or information therebetween. Similarly, shared frequency management apparatus 2 and SU system 3 can perform transmission and reception of data or information therebetween. For better understanding of description, FIG. 2 illustrates only a single SU system 3, but a plurality of SU systems may be provided.

PU system 1 as an example of a first wireless system is a wireless system controlled to be operated by a system operator (a so-called primary user) to whom frequencies (for example, the 20 GHz to the 30 GHz band) of a predetermined shared frequency band are allocated to be mainly or substantially exclusively usable. PU system 1 includes one or more PU transmitters 11, memories 12, and PU receivers 13 required to operate PU system 1. In other words, each of PU transmitter 11 and PU receiver 13 is used to execute a wireless service provided by PU system 1. Memory 12 stores PU system information required to operate PU system 1. Here, the PU system information includes, for example, information regarding transmission such as a transmitter position indicating an installation position of PU transmitter 11, a carrier frequency (center frequency), a bandwidth, and transmission power, and information regarding reception such as a receiver position indicating an installation position of PU receiver 13 and a reception sensitivity.

Shared frequency management apparatus 2 is configured to include B1 deriving unit 21, B2 deriving unit 22, permission target frequency sharing condition determination unit 23, memory 24, topography/building geographic data holding unit 25, and communication interface circuit 26. B1 deriving unit 21, B2 deriving unit 22, and permission target frequency sharing condition determination unit 23 are configured by using processor PRC1 such as a central processing unit (CPU), a digital signal processor (DSP), or a field programmable gate array (FPGA), and are functionally configured by processor PRC1 reading and executing a program stored in memory 24. Details of a configuration of shared frequency management apparatus 2 will be described later. Processor PRC1 functions as a controller controlling an operation of shared frequency management apparatus 2, and performs a control process for totally controlling operations of the respective units of shared frequency management apparatus 2, data input and output processes among the respective units of shared frequency management apparatus 2, a data calculation (computation) process, and a data storage process. Processor PRC1 operates according to a program stored in memory 24. Processor PRC1 uses memory 24 during an operation, and stores data generated by processor PRC1 into memory 24.

SU system 3 as an example of a second wireless system is a wireless system that applies to shared frequency management apparatus 2 for conditional use of some frequencies (for example, the 20 GHz to the 30 GHz band) of the predetermined shared frequency band mainly or substantially exclusively usable by PU system 1. SU system 3 includes one or more SU transmitters 31, memories 32, and SU receivers 33 required to operate SU system 3. In other words, each of SU transmitter 31 and SU receiver 33 is used to execute a wireless service provided by SU system 3. Memory 32 holds SU system information required to operate SU system 3. Here, the SU system information includes, for example, at least a carrier frequency (center frequency), a bandwidth, and transmission power including a transmission directivity gain. The SU system information may further include third border B3 indicating a border line of a restricted area in which a wireless service of SU system 3 is received and a measurement result of reception power in a radio wave sensor (for example, radio wave sensor 344).

Each of radio wave sensors 341 to 344 as an example of a sensor measures reception power of a wireless signal based on transmission power from SU transmitter 31 of SU system 3, and reports the measured reception power to SU system 3. The measurement of reception power in each of radio wave sensors 341 to 344 may be performed to monitor whether or not actual reception power of a wireless signal using carrier frequency $f_k$ permitted to be used in SU system 3 by shared frequency management apparatus 2 complies with reception power defined in a shared frequency use condition (will be described later). The number of disposed radio wave sensors may be one or more except four.

Here, details of a configuration of shared frequency management apparatus 2 will be described.

B1 deriving unit 21 acquires the PU system information sent from PU system 1 via communication interface circuit 26, and recognizes the PU system information. B1 deriving unit 21 reads geographic information from topography/building geographic data holding unit 25, and derives B1($f_k$) as an example of first border information regarding the first border corresponding to carrier frequency $f_k$ by using the geographic information and the PU system information. As described above, in a case where a wireless signal with carrier frequency $f_k$ is transmitted from PU system 1, B1($f_k$) indicates a border line connecting reception points where reception power of the wireless signal becomes the reception sensitivity (refer to the above description) of PU system 1, to each other. In other words, B1 deriving unit 21 can derive position information of a region (an example of a first region) surrounded by first border B1. B1 deriving unit 21 outputs the derived first border information to permission target frequency sharing condition determination unit 23.

B2 deriving unit 22 as an example of a deriving unit acquires the SU system information sent from SU system 3 via communication interface circuit 26, and recognizes the SU system information. The SU system information includes, for example, a carrier frequency (center frequency), a bandwidth, transmission power including a transmission directivity gain, third border B3 indicating a border line of a restricted area in which a wireless service of SU system 3 is received, and a measurement result of reception power in a radio wave sensor (for example, radio wave sensor 344). B2 deriving unit 22 derives B2($f_k$) as an example of second border information regarding the second border corresponding to carrier frequency $f_k$ through computation (which will be described later) by using the SU system information. As described above, in a case where a wireless signal with carrier frequency $f_k$ is transmitted from SU system 3, B2($f_k$) indicates a border line connecting reception points where reception power of the wireless signal becomes the reception sensitivity (refer to the above description) of PU system 1, to each other. In other words, B2 deriving unit 22 can derive position information of a region (an example of a second region) surrounded by second border B2. B2 deriving unit 22 outputs the derived second border information to permission target frequency sharing condition determination unit 23.

Permission target frequency sharing condition determination unit 23 as an example of an input unit receives first border information (B1($f_k$)) from B1 deriving unit 21 and second border information (B2($f_k$)) from B2 deriving unit 22. Permission target frequency sharing condition determination unit 23 determines a shared frequency use condition (an example of a sharing permission condition) regarding a frequency of a shared frequency band for SU system 3 by using first border information (B1($f_k$)) and second border information (B2($f_k$)) from B2 deriving unit 22. In other words, permission target frequency sharing condition determination unit 23 as an example of a permission condition determination unit transmits a determination result of whether or not SU system 3 is permitted to use carrier frequency $f_k$ to SU system 3 via communication interface circuit 26.

Memory 24 is configured by using a random access memory (RAM) and a read only memory (ROM), and temporarily preserves a program required to perform an operation of shared frequency management apparatus 2, and data or information generated during an operation. The RAM is, for example, a work memory used during an operation of processor PRC1. The ROM stores in advance, for example, a program for controlling processor PRC1.

Topography/building geographic data holding unit 25 as an example of a geographic data holding unit is configured by using a hard disk drive (HDD) or a solid state drive (SSD), and stores geographic information including topographic information and building information in areas where PU system 1 and SU system 3 are installed.

Communication interface circuit 26 is configured by using a communication circuit used to perform transmission and reception of data or information with a network (for example, an intranet or the Internet) connected to shared frequency management apparatus 2. Communication interface circuit 26 performs transmission and reception of data or information with PU system 1 and SU system 3 connected to the network. Communication interface circuit 26 as an example of a notification unit notifies SU system 3 of the shared frequency use condition determined by permission target frequency sharing condition determination unit 23.

Here, a detailed description will be made of a computation example for deriving second border information (B2($f_k$)) in B2 deriving unit 22. In Exemplary Embodiment 1, deriving second border information (B2($f_k$)) indicates deriving propagation distance $d_2$ at which reception power of a wireless signal (an example of a second wireless signal) from a position (for example, a transmission point position where SU transmitter 31 is disposed) of SU system 3 in third border B3 is reduced to a reception sensitivity of PU system 1. As methods of B2 deriving unit 22 deriving propagation distance $d_2$, the following four methods may be considered. In a description of the following computation example, as parameters used in common, bandwidth B used in a wireless service of PU system 1 is 60 MHz, carrier frequency $f_k$ is 26000 MHz, a reception carrier to noise ratio (CNR) at propagation distance $d_2$ is 0 dB, and a noise figure Nf is 6 dB.

First computation method: method of applying radio wave propagation loss formula in ideal radio wave propagation environment In the first computation method, an ideal radio wave propagation environment is supposed, and thus B2 deriving unit 22 does not use a measurement result of reception power in a radio wave sensor. Transmission power P of a wireless signal (second wireless signal) from SU system 3 is assumed to be 30 dBm.

As the radio wave propagation loss formula, propagation loss L is expressed by Equation (1). In Equation (1), a which indicates a radio wave propagation attenuation coefficient is about 2.0 in a line of sight (LOS) environment (that is, a prediction environment), and is about 3.0 to 4.0 in a non-line of sight (NLOS) environment. f indicates a carrier frequency [MHz]. A indicates an additional loss [dB]. In order not to underestimate propagation distance $d_2$, $\alpha=2.0$ and $A=0$ may be assumed.

$$L=10\alpha \log_{10} d_2+20 \log_{10} f-28+A \quad (1)$$

As expressed in Equation (2), a difference between transmission power P and propagation loss L may be evaluated to be a reception CNR and a noise level of a reception signal at a position of SU receiver 33.

$$P-L=CNR+kTBN_f \quad (2)$$

Therefore, B2 deriving unit 22 may calculate propagation distance $d_2 \approx 1000$ m by assigning carrier frequency $f_k=26000$ MHz, radio wave propagation attenuation coefficient $\alpha=2.0$, additional loss $A=0$ dB, bandwidth $B=60$ MHz, the reception CNR=0 dB, $kT=-174$ dBm/Hz, and noise figure Nf=6 dB to Equations (1) and (2). In other words, in a case where propagation distance $d_2$ is not underestimated by using radio wave propagation attenuation coefficient $\alpha=2.0$ and additional loss $A=0$ dB, propagation distance $d_2$ has such a great value.

Second computation method: method of applying actually measured value of reception power in radio wave sensor to radio wave propagation loss formula in actual environment In the second computation method, B2 deriving unit 22 uses an actually measured value (measurement result) of reception power in a radio wave sensor in an actual environment. Reception power at a position (for example, an installation position of radio wave sensor 344 in FIG. 1) on third border B3 corresponding to a position of propagation distance $d_1$ from a transmission point position of SU transmitter 31 is indicated by $R_1$, and reception power at a position (for example, reception point position Ci in FIG. 1) on second border B2 corresponding to a position of propagation distance $d_2$ from the transmission point position of SU transmitter 31 is indicated by $R_2$.

In this case, when Equation (1) and (2) are applied to each of reception power $R_1$ and $R_2$, the following Equation (3) and Equation (4) are established. In Equation (4), reception power $R_2$ is assumed to be a noise level. B2 deriving unit 22 assumes both of additional loss $A_1$ in Equation (3) and additional loss $A_2$ in Equation (4) to be an identical constant value (that is, A is not 0 unlike the first computation method), and can thus estimate propagation distance $d_2$ suitable for a more actual real environment than in the first computation method.

$$L_1=10\alpha_1 \log_{10} d_1+20 \log_{10} f-28+A_1=P-R_1 \quad (3)$$

$$L_2=10\alpha_2 \log_{10} d_2+20 \log_{10} f-28+A_2=P-R_2=P-kTBN_f \quad (4)$$

In other words, in Equations (3) and (4), additional loss $A_1$ is assumed to be the same as additional loss $A_2$, and thus the following Equation (5) is obtained. In Equation (5), in order not to underestimate propagation distance $d_2$, radio wave propagation attenuation coefficients $\alpha_1$ and $\alpha_2$ are assumed to be $\alpha_2=2.0$ and $\alpha_1>2.0$ (for example, $\alpha_1=3.0$).

$$\begin{aligned}10\alpha_2 \log_{10} d_2 &= P - kTBN_f - 20\log_{10} f + 28 - A_2 \\&= P - kTBN_f - 20\log_{10} f + 28 - A_2 \\&= P - kTBN_f - 20\log_{10} f + 28 - \\& \quad (P - R_1 - 10\alpha_1 \log_{10} d_1 - 20\log_{10} f + 28) \\&= R_1 - kTBN_f + 10\alpha_1 \log_{10} d_1\end{aligned} \quad (5)$$

Therefore, as a computation example, in a case where reception power $R_1$ measured by the radio wave sensor at propagation distance $d_1=10$ m is $-70$ dBm, B2 deriving unit 22 may calculate propagation distance $d_2 \approx 324$ m by assigning reception power $R_1$ to Equation (5).

Third and fourth computation methods: method of applying radio wave propagation attenuation coefficients $\alpha_1$ and $\alpha_2$ having values that are different from supposed values in second computation method In the third and fourth computation methods, B2 deriving unit 22 uses supposed values suitable for a more realistic environment than supposed values of radio wave propagation attenuation coefficients $\alpha_1$ and $\alpha_2$ in the second computation method. For example, propagation loss $L_1$ is a propagation loss of a radio wave at a restricted area (in other words, a relatively short distance) of SU system 3, and thus radio wave propagation attenuation coefficient $\alpha_1$ corresponding to propagation loss $L_1$ may have a value (in other words, close to a predicted propagation path) smaller than 3.0. On the other hand, propagation loss $L_2$ is a propagation loss of a radio wave at areas (in other words, a relatively long distance) other than a restricted area of SU system 3, and thus radio wave propagation attenuation coefficient $\alpha_2$ corresponding to propagation loss $L_2$ may have a value greater than 2.0.

Therefore, in the third computation method, assuming that $\alpha_1$ is 3.0, and $\alpha_2$ is 3.0, B2 deriving unit 22 may calculate propagation distance $d_2 \cong 47$ m by assigning reception power $R_1$ of −70 dBm measured by the radio wave sensor at propagation distance $d_1 = 10$ m to Equation (5) (refer to the second computation method).

Similarly, in the fourth computation method, assuming that $\alpha_1$ is 2.0, and $\alpha_2$ is 3.0, B2 deriving unit 22 may calculate propagation distance $d_2 \cong 22$ m by assigning reception power $R_1$ of −70 dBm measured by the radio wave sensor at propagation distance $d_1 = 10$ m to Equation (5) (refer to the second computation method).

As mentioned above, in calculating propagation distance $d_2$, B2 deriving unit 22 may use measured values of propagation distance $d_1$ and reception power $R_1$, and may use assumed values of radio wave propagation attenuation coefficients $\alpha_1$ and $\alpha_2$, to be assigned to Equation (5). Hereinafter, Table 1 shows a relationship among propagation distance $d_1$ [m], reception power $R_1$ [dBm], radio wave propagation attenuation coefficients $\alpha_1$ and $\alpha_2$, propagation distance $d_2$ [m], and power (P−$A_1$) [dBm]. As shown in Table 1, it can be seen that a value of propagation distance $d_2$ greatly depends on a combination of assumed values of radio wave propagation attenuation coefficients $\alpha_1$ and $\alpha_2$. Power (P−$A_1$) can be derived from Equation (3), and is an image of a value obtained by subtracting a loss in a case where a shield is inserted into a propagation path from transmission power.

In other words, it is assumed that radio wave propagation attenuation coefficient $\alpha_1$ at propagation distance $d_1$ from a transmission point that is a disposition location of transmitter Tx of SU system 3 in which a radio wave propagates at a relatively short distance to an installation position of a radio wave sensor (for example, radio wave sensor 344) employs 2.0 corresponding to the LOS environment, and radio wave propagation attenuation coefficient $\alpha_2$ at propagation distance $d_2$ at which reception power of a radio wave is reduced to a noise level from a transmission point that is a disposition location of transmitter Tx of SU system 3 in which a radio wave propagates at a relatively long distance employs 3.0 corresponding to the NLOS environment.

In this case, propagation distance $d_2$ derived by B2 deriving unit 22 is calculated as the smallest value among values obtained according to the first computation method to the fourth computation method. This value may be the most realistic value at a glance, but it may not be proper that an establisher of SU system 3 employs the smallest value as propagation distance $d_2$ depending on a supposed use environment of a wireless service. Thus, the establisher of SU system 3 preferably measures which value of propagation distance $d_2$ obtained through computation is most appropriate for an actual environment on the basis of actual measurement or simulation at least before a wireless service is started. When B2 deriving unit 22 calculates propagation distance $d_2$ so as to derive second border B2, it is more appropriate to determine radio wave propagation attenuation coefficients $\alpha_1$ and $\alpha_2$ by measuring reception power by using each of one or more radio wave sensors 341 to 344 with a propagation distance from a transmission point that is a disposition position of transmitter Tx as a parameter in the vicinity of a restricted area of SU system 3, and obtaining radio wave propagation attenuation coefficients $\alpha_1$ and $\alpha_2$ through measurement.

TABLE 1

| $d_1$[m] | $R_1$[dBm] | $\alpha_1$ | $\alpha_2$ | $d_2$[m] | P − $A_1$[dBm] |
|---|---|---|---|---|---|
| 10 | −70 | 3.0 | 2.0 | 324 | 20.3 |
| 10 | −70 | 3.0 | 3.0 | 47 | 20.3 |
| 10 | −70 | 2.0 | 3.0 | 22 | 10.3 |
| 10 | −60 | 3.0 | 2.0 | 1023 | 30.3 |
| 10 | −60 | 3.0 | 3.0 | 102 | 30.3 |
| 10 | −60 | 2.0 | 3.0 | 47 | 20.3 |
| 10 | −80 | 3.0 | 2.0 | 102 | 10.3 |
| 10 | −80 | 3.0 | 3.0 | 22 | 10.3 |
| 10 | −80 | 2.0 | 3.0 | 10 | 0.3 |
| 50 | −70 | 3.0 | 2.0 | 3631 | 41.3 |
| 50 | −70 | 3.0 | 3.0 | 236 | 41.3 |
| 50 | −70 | 2.0 | 3.0 | 64 | 24.3 |
| 100 | −70 | 3.0 | 2.0 | 10233 | 50.3 |
| 100 | −70 | 3.0 | 3.0 | 471 | 50.3 |
| 100 | −70 | 2.0 | 3.0 | 101 | 30.3 |

Actually, measuring reception power $R_1$ (measured value) at an installation location (that is, propagation distance $d_1$ from a transmission point that is a disposition location of transmitter Tx) of a radio wave sensor is not difficult work even though periodically performed (for example, once an hour), but measuring propagation distance $d_2$ (in other words, a distance at which attenuation to reception power having no influence on PU system 1 occurs from the transmission point that is a disposition location of transmitter Tx) required to embody the presence of second border B2 is difficult work. Periodically measuring propagation distance $d_2$ is more difficult work, and thus Exemplary Embodiment 1 has a characteristic technical element in that propagation distance $d_2$ is calculated by using the computation formulae instead of measurement using a radio wave sensor.

However, in the computation formulae for deriving propagation distance $d_2$, assuming radio wave propagation attenuation coefficients $\alpha_1$ and $\alpha_2$ (for example, $\alpha_1$=2.0 and $\alpha_2$=3.0) having the great influence on calculation of propagation distance $d_2$ as appropriate has the following risks. Specifically, there is a risk of underestimating propagation distance $d_2$ (that is, a case where radio wave propagation attenuation coefficient $\alpha_1$ is assumed to be a value smaller than a value suitable for an actual environment, and radio wave propagation attenuation coefficient $\alpha_2$ is assumed to be a value greater than a value suitable for an actual environment), or a risk of uselessly overestimating propagation distance $d_2$ (a case where radio wave propagation attenuation coefficient $\alpha_1$ is assumed to be a value greater than a value suitable for an actual environment, and radio wave propagation attenuation coefficient $\alpha_2$ is assumed to be a value smaller than a value suitable for an actual environment).

Therefore, as described above, it is proper that the establisher of SU system 3 performs work, at least once, of measuring reception power by changing a propagation distance from a transmission point that is a disposition location of transmitter Tx in the restricted area (in other words, the area surrounded by third border B3) of SU system 3 as a parameter, and obtaining values of radio wave propagation attenuation coefficients $\alpha_1$ and $\alpha_2$ through actual measurement on the basis of a measurement result.

Therefore, since avoiding the risk of underestimating propagation distance $d_2$ is to be emphasized more than avoiding the risk of uselessly overestimating propagation distance $d_2$, radio wave propagation attenuation coefficient $\alpha_1$ is to be determined to be a value slightly greater than a value obtained through measurement, and radio wave propagation attenuation coefficient $\alpha_2$ is to be determined to be a value slightly smaller than a value obtained through measurement. For example, in a case $\alpha_1$ is 2.08 and $\alpha_2$ is 3.23 through measurement, when $\alpha_1$=2.2 and $\alpha_2$=3.0 are used in Equation (5) instead of assigning the original values to Equation (5), propagation distance $d_2$ is calculated to be a value greater than an actual value. In other words, consequently, the prerequisite that interference from SU system 3 does not have an ill effect on PU system 1 can be more reliably observed.

On the other hand, in a case where first border B1 of PU system 1 is clearly separated from second border B2 of SU system 3 (for example, intersection area S illustrated in FIG. 1 does not occur), propagation distance $d_2$ may be calculated by employing $\alpha_1$=3.0 and $\alpha_2$=2.0 in awareness of the risk of uselessly overestimating propagation distance $d_2$. In this case, measurement work for deriving radio wave propagation attenuation coefficient $\alpha$ is not necessary.

Figure 3:
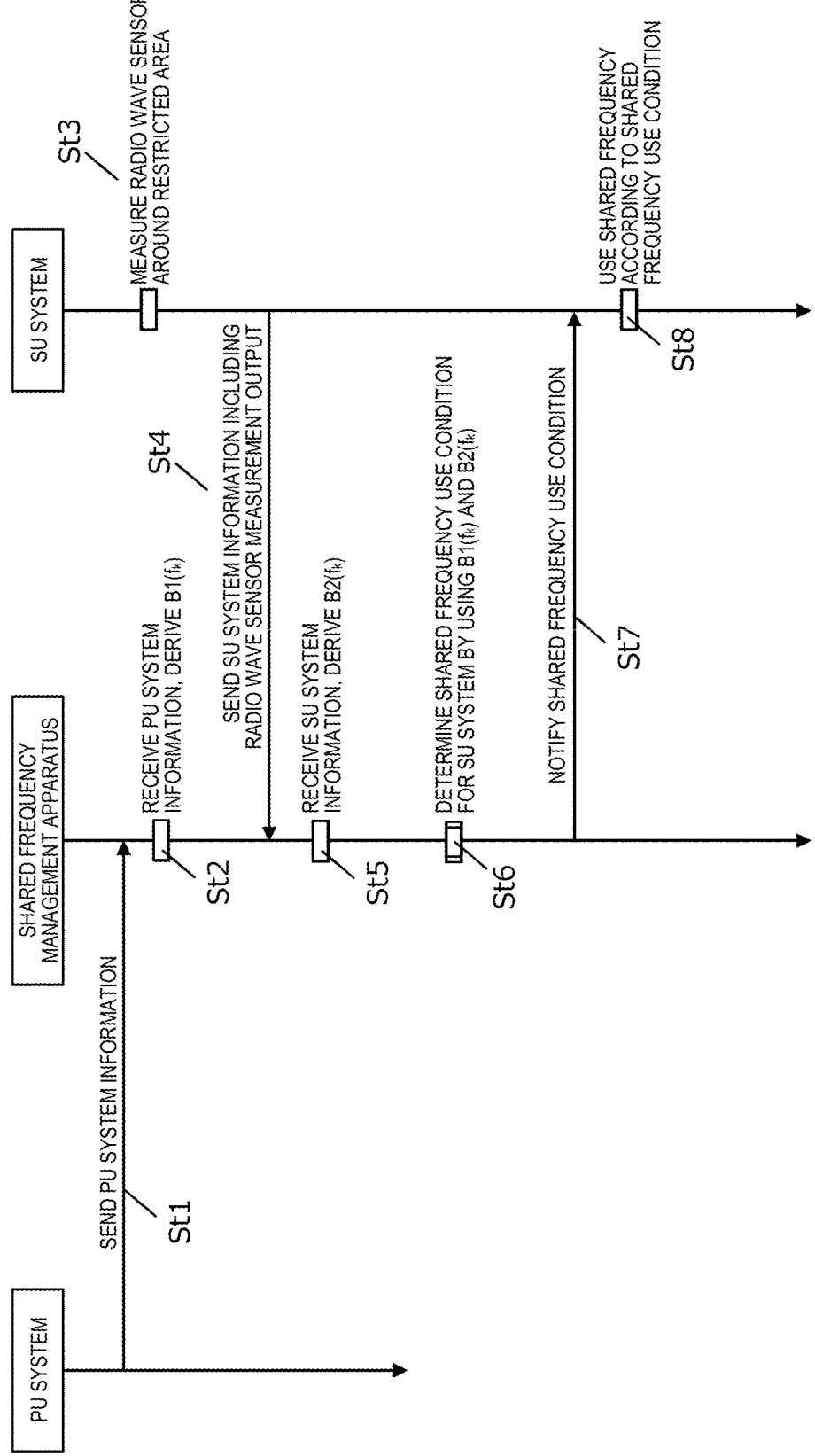
FIG. 3 is a sequence diagram illustrating a time series of operation procedures of the shared frequency management system according to Exemplary Embodiment 1.
Figure 4:
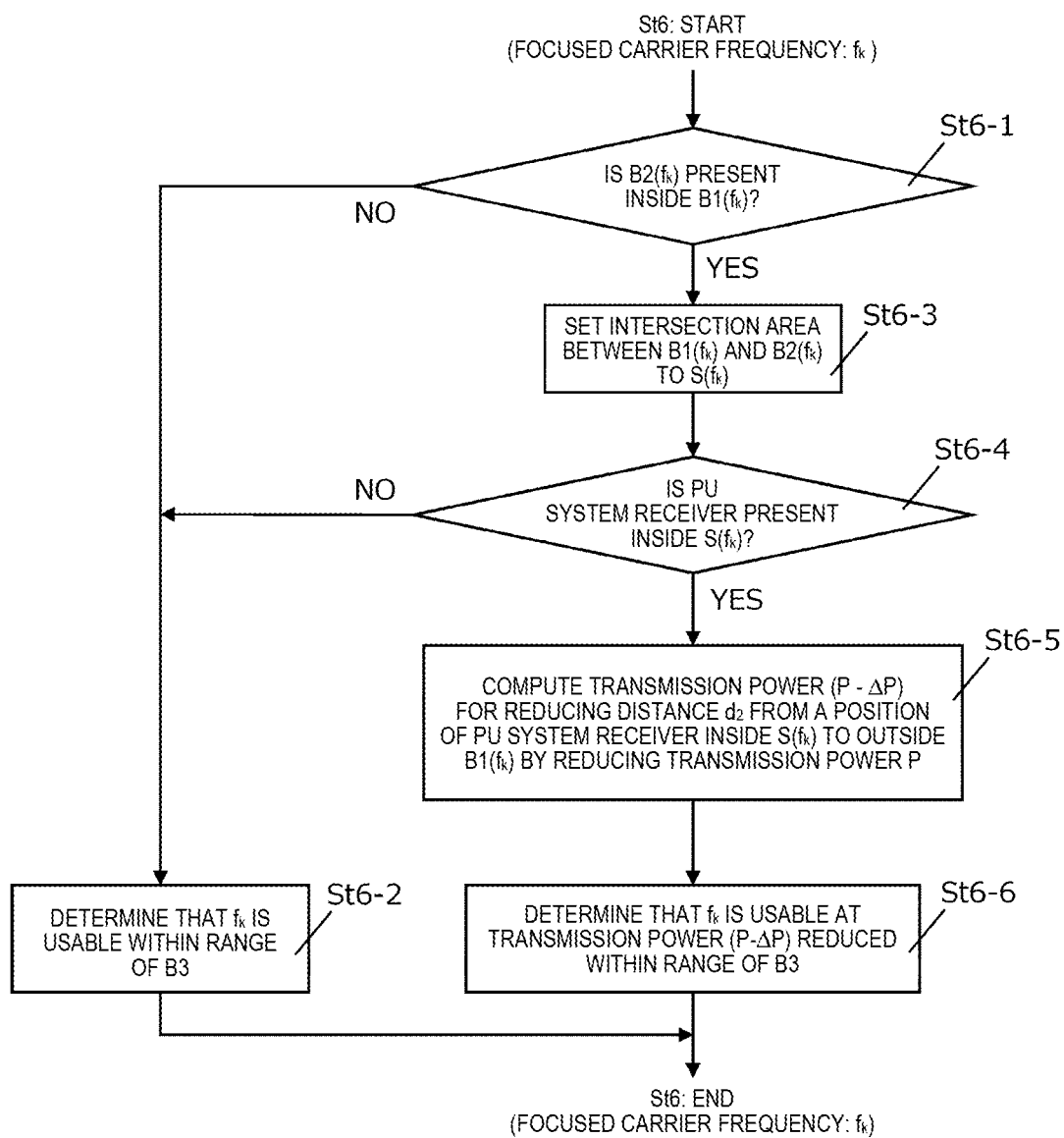
FIG. 4 is a flowchart illustrating a time series of detailed operation procedures in step St6 in FIGS. 3 and 6.

Next, with reference to FIGS. 3 and 4, a description will be made of operation procedures of the shared frequency management system according to Exemplary Embodiment 1. FIG. 3 is a sequence diagram illustrating a time series of operation procedures of the shared frequency management system according to Exemplary Embodiment 1. FIG. 4 is a flowchart illustrating a time series of detailed operation procedures in step St6 in FIG. 3.

In FIG. 3, PU system 1 sends PU system information (for example, information regarding transmission such as a transmitter position indicating an installation position of PU transmitter 11, a carrier frequency (center frequency), a bandwidth, and transmission power, and information regarding reception such as a receiver position indicating an installation position of PU receiver 13 and a reception sensitivity) to shared frequency management apparatus 2 (St1).

Shared frequency management apparatus 2 receives the PU system information sent in step St1, and reads geographic information from topography/building geographic data holding unit 25. Shared frequency management apparatus 2 causes B1 deriving unit 21 to derive B1($f_k$) as an example of first border information regarding the first border corresponding to carrier frequency $f_k$ by using the geographic information and the PU system information (St2).

SU system 3 measures reception power of a wireless signal in each of one or more radio wave sensors 341 to 344 disposed around a restricted area in response to transmission of the wireless signal based on transmission power from SU transmitter 31 of SU system 3 (St3). SU system 3 sends SU system information (for example, a carrier frequency, a bandwidth, transmission power, and third border information indicating a border line of the restricted area of SU system 3) including a measurement result of the reception power in step St3, to shared frequency management apparatus 2 (St4).

Shared frequency management apparatus 2 receives the SU system information sent in step St4, and causes B2 deriving unit 22 to derive B2($f_k$) as an example of second border information corresponding to carrier frequency $f_k$ through computation (refer to any one of the first computation method to the fourth computation method) by using the SU system information (St5). Shared frequency management apparatus 2 determines a shared frequency use condition regarding a frequency of a shared frequency band for SU system 3 by using first border information (B1($f_k$)) and second border information (B2($f_k$)) from B2 deriving unit 22 (St6). Shared frequency management apparatus 2 notifies SU system 3 of the shared frequency use condition determined in step St6 (St7).

SU system 3 can use a shared frequency in a wireless service of SU system 3 according to the shared frequency use condition of which a notification is sent from shared frequency management apparatus 2 in step St7 (St8).

Next, with reference to FIG. 4, a description will be made of details of an operation of shared frequency management apparatus 2 regarding determination of the shared frequency use condition in step St6. The process illustrated in FIG. 4 is performed by, for example, permission target frequency sharing condition determination unit 23 of shared frequency management apparatus 2, and is a process of determining a shared frequency use condition corresponding to focused carrier frequency $f_k$ in a shared frequency band, and a process of determining a shared frequency use condition corresponding to another carrier frequency in the identical shared frequency band is repeatedly performed in the same manner. In other words, shared frequency management apparatus 2 repeatedly performs the process of determining a shared frequency use condition illustrated in FIG. 4 so as to sequentially sweep carrier frequencies of a shared frequency band.

In FIG. 4, shared frequency management apparatus 2 determines whether or not second border B2($f_k$) is present inside first border B1($f_k$) (that is, a communication area in which a wireless service of PU system 1 is received) by using the PU system information and the SU system information (St6-1). In a case where it is determined that second border B2($f_k$) is not present inside first border B1($f_k$) (NO in St6-1), shared frequency management apparatus 2 determines that currently focused carrier frequency $f_k$ is usable within a range of third border B3 (St6-2). This is because, since second border B2($f_k$) is not present inside first border B1($f_k$), even though SU system 3 provides a wireless service using currently focused carrier frequency $f_k$, it is hard to give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

On the other hand, in a case where it is determined that second border B2($f_k$) is present inside first border B1($f_k$) (YES in St6-1), shared frequency management apparatus 2 sets an intersection area (overlapping area) with second border B2($f_k$) present inside first border B1($f_k$) to S($f_k$) (St6-3).

Shared frequency management apparatus 2 determines whether or not PU receiver 13 of PU system 1 is present inside intersection area S($f_k$) by using the PU system information and the SU system information (St6-4). In a case where it is determined that PU receiver 13 of PU system 1 is not present inside intersection area S($f_k$) (NO in St6-4), shared frequency management apparatus 2 similarly determines that currently focused carrier frequency $f_k$ is usable within a range of third border B3 (St6-2). This is because, since PU receiver 13 receiving a wireless signal from PU transmitter 11 of PU system 1 during an operation of PU system 1 is not present inside intersection area S($f_k$) in the first place, even though SU system 3 provides a wireless service using currently focused carrier frequency $f_k$, it is hard to give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

On the other hand, in a case where it is determined that PU receiver 13 of PU system 1 is present inside intersection area $S(f_k)$ (YES in St6-4), shared frequency management apparatus 2 computes transmission power (P−ΔP) required to reduce propagation distance $d_2$ to a position of PU receiver 13 of PU system 1 inside intersection area $S(f_k)$ to any position outside first border B1$(f_k)$ by referring to Equations (3) and (4) (St6-5). Shared frequency management apparatus 2 determines that currently focused carrier frequency $f_k$ is usable assuming that transmission power (P−ΔP) after the reduction, computed in step St6-5 is used within the range of third border B3 (St6-6). This is because, since PU receiver 13 receiving a wireless signal from PU transmitter 11 of PU system 1 during an operation of PU system 1 is present inside intersection area $S(f_k)$ in the first place, when SU system 3 provides a wireless service using currently focused carrier frequency $f_k$, transmission power from SU transmitter 31 of SU system 3 is to be reduced such that a radio wave from SU system 3 does not give interference of a reception sensitivity or more to a wireless service of PU system 1. Thereafter, the process of determining a shared frequency use condition corresponding to currently focused carrier frequency $f_k$ is finished, and a process of determining a shared frequency use condition corresponding to next focused carrier frequency $f_k$ is performed in the same manner.

As mentioned above, in the shared frequency management system according to Exemplary Embodiment 1, shared frequency management apparatus 2 manages sharing of a frequency of a shared frequency band that is mainly used by PU system 1, with SU system 3. Shared frequency management apparatus 2 derives the first border information regarding first border B1 indicating a border of a first region in which a reception level based on transmission of a wireless signal using a frequency of a shared frequency band from PU system 1 becomes a defined value (for example, a reception sensitivity). Shared frequency management apparatus 2 derives the second border information regarding second border B2 indicating a border of a second region in which a reception level based on transmission of a wireless signal using a frequency of a shared frequency band from SU system 3 becomes a defined value (for example, a reception sensitivity). Shared frequency management apparatus 2 determines a shared frequency use condition regarding a frequency of a shared frequency band for SU system 3 on the basis of the first border information and the second border information.

Consequently, shared frequency management apparatus 2 can easily manage permission of SU system 3's use of at least some shared frequencies preferentially usable by PU system 1 without performing complicated interference computation described in the first approach in the related art. Shared frequency management apparatus 2 can simplify procedures of sharing a frequency of a shared frequency band between PU system 1 and SU system 3 without building a reception power map that is considerably difficult to build as described in the second approach in the related art, and can thus improve a possibility of realizing frequency sharing. Shared frequency management apparatus 2 can suppress SU system 3 from giving interference of a reception sensitivity or more of PU system 1 due to a radio wave to PU system 1, and can thus suppress a reduction of use efficiency of a frequency of a shared frequency band between PU system 1 and SU system 3 by freely permitting some frequencies of the shared frequency band used by PU system 1 to be used by SU system 3.

Shared frequency management apparatus 2 determines a shared frequency use condition for each frequency of a shared frequency band. Consequently, shared frequency management apparatus 2 can determine whether or not a use permission is given to SU system 3 for each of a plurality of carrier frequencies of a shared frequency band (for example, the 20 GHz to 30 GHz band), and can thus relatively easily guarantee the presence of a carrier frequency that can be permitted to be used by SU system 3.

Shared frequency management apparatus 2 derives the second border information by using information regarding a communication method of SU system 3, including reception power of a wireless signal from SU system 3 measured by each of radio wave sensors 341 to 344 provided around a local area (for example, a restricted area) in which SU system 3 is used. Consequently, shared frequency management apparatus 2 uses an actually measured value of reception power of which a radio wave radiated from SU system 3 is measured around a border of the restricted area of SU system 3, and can thus derive a propagation distance of a radio wave that does not give interference to PU system 1 and is suitable for an actual operation environment of SU system 3.

In a case where it is determined that an overlapping region between first border B1 and second border B2 is not present on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used. Consequently, shared frequency management apparatus 2 may determine that a possibility of a radio wave radiated from SU system 3 having an ill effect such as interference on PU receiver 13 present in a communication area of PU system 1 is low. Therefore, even though the shared frequency management apparatus 2 permits SU system 3 to use the focused carrier frequency, PU system 1 is not hindered from using a shared frequency, and thus it is possible to effectively promote frequency sharing for SU system 3.

In a case where it is determined that an overlapping region between first border B1 and second border B2 is present, and PU receiver 13 corresponding to PU system 1 is not disposed in the overlapping region, on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used. Consequently, even though intersection area $S(f_k)$ is present, PU receiver 13 is not present in the intersection area, and thus shared frequency management apparatus 2 may determine that a possibility of a radio wave radiated from SU system 3 having an ill effect such as interference on PU receiver 13 present in a communication area of PU system 1 is substantially low. Therefore, even though shared frequency management apparatus 2 permits SU system 3 to use the focused carrier frequency, PU system 1 is not substantially hindered from using a shared frequency, and thus it is possible to effectively promote frequency sharing for SU system 3.

In a case where it is determined that an overlapping region between first border B1 and second border B2 is present, and PU receiver 13 corresponding to PU system 1 is disposed in the overlapping region, on the basis of the first border information and the second border information corresponding to any one specific frequency (for example, focused carrier frequency $f_k$) among frequencies of a shared frequency band, shared frequency management apparatus 2 determines that the specific frequency is permitted to be used in a local area (for example, a restricted area) in which SU system 3 is used assuming that transmission power of a wireless signal from SU system 3 in the local area is reduced by a predetermined amount. Consequently, shared frequency management apparatus 2 can reduce a radio wave radiated from SU system 3 to transmission power with which the radio wave propagates to only the outside of first border B1, and can thus reduce a possibility of the radio wave radiated from SU system 3 having an ill effect such as interference on PU receiver 13 present in a communication area of PU system 1. Therefore, even though shared frequency management apparatus 2 permits SU system 3 to use the focused carrier frequency on the condition that transmission power with which a radio wave propagates to only the outside of first border B1 is used, PU system 1 is not substantially hindered from using a shared frequency, and thus it is possible to effectively promote frequency sharing for SU system 3.

Shared frequency management apparatus 2 further includes topography/building geographic data holding unit 25 holding geographic information indicating topography and the presence or absence of a building of an area in which a wireless signal from PU system 1 is received. Shared frequency management apparatus 2 derives the first border information by using information regarding a communication method of PU system 1 and the geographic information read from topography/building geographic data holding unit 25. Consequently, shared frequency management apparatus 2 can adaptively derive first border B1 where reception power becomes a reception sensitivity in accordance with an actual environment by taking into consideration geographic information regarding topography or a building present in a propagation path through which a radio wave radiated from PU system 1 propagates.

Shared frequency management apparatus 2 notifies SU system 3 of a shared frequency use condition. Consequently, SU system 3 can use a shared frequency (carrier frequency) defined in the shared frequency use condition to the extent of not giving interference in which reception power becomes a reception sensitivity or more to PU system 1 on the basis of the shared frequency use condition determined by shared frequency management apparatus 2.

Details leading to contents of Exemplary Embodiment 2 As described above in the related art, in order for shared frequency management apparatus 102 (refer to FIG. 10) to permit a shared frequency to be used, wireless parameters given to SU system 103 may include, for example, a carrier frequency, a wireless bandwidth, transmission power, and a transmission directivity gain. Thus, an upper limit of a value of transmission power including a transmission directivity gain for SU system 103 in a direction in which a border of an allowable interference level is closest to SU system 103 may be defined such that the allowable interference level in PU system 101 is the minimum, and a frequency use permission may be given to SU system 103 such that the upper limit is not exceeded. Here, the direction of being closest is not limited to the concept of merely being geographically close, and may include the concept that the extent of interference due to radiation of a radio wave from the SU system is small.

However, in the use permission method, in radio resource control during the use of a radio wave in SU system 103, an upper limit of a value of transmission power including a transmission directivity gain in a direction in which interference given from SU system 103 has the greatest influence on PU system 101 is equally applied to all directions of 360 degrees when viewed from SU system 103. Therefore, for example, in a case where there is a direction in which interference given from SU system 103 does not have the great influence on PU system 101, the use of transmission power exceeding the upper limit of a value of the transmission power including a transmission directivity gain is not permitted with respect to the direction, and this may restrict a frequency effective use in SU system 103.

Exemplary Embodiment 2

In Exemplary Embodiment 2, a description will be made of examples of a wireless system capable of using a shared frequency and a radio resource allocation method in wireless communication using a shared frequency, capable of suppressing a reduction of use efficiency of a shared frequency by adaptively controlling transmission power according to a direction of wireless communication when at least some shared frequencies preferentially usable by a PU system are used by a SU system.

In a configuration of a shared frequency management system according to Exemplary Embodiment 2, the same configuration as the configuration of the shared frequency management system according to Exemplary Embodiment 1 will be given the same reference numeral, and a description thereof will be made briefly or will be omitted, and different contents will be described.

Figure 5:
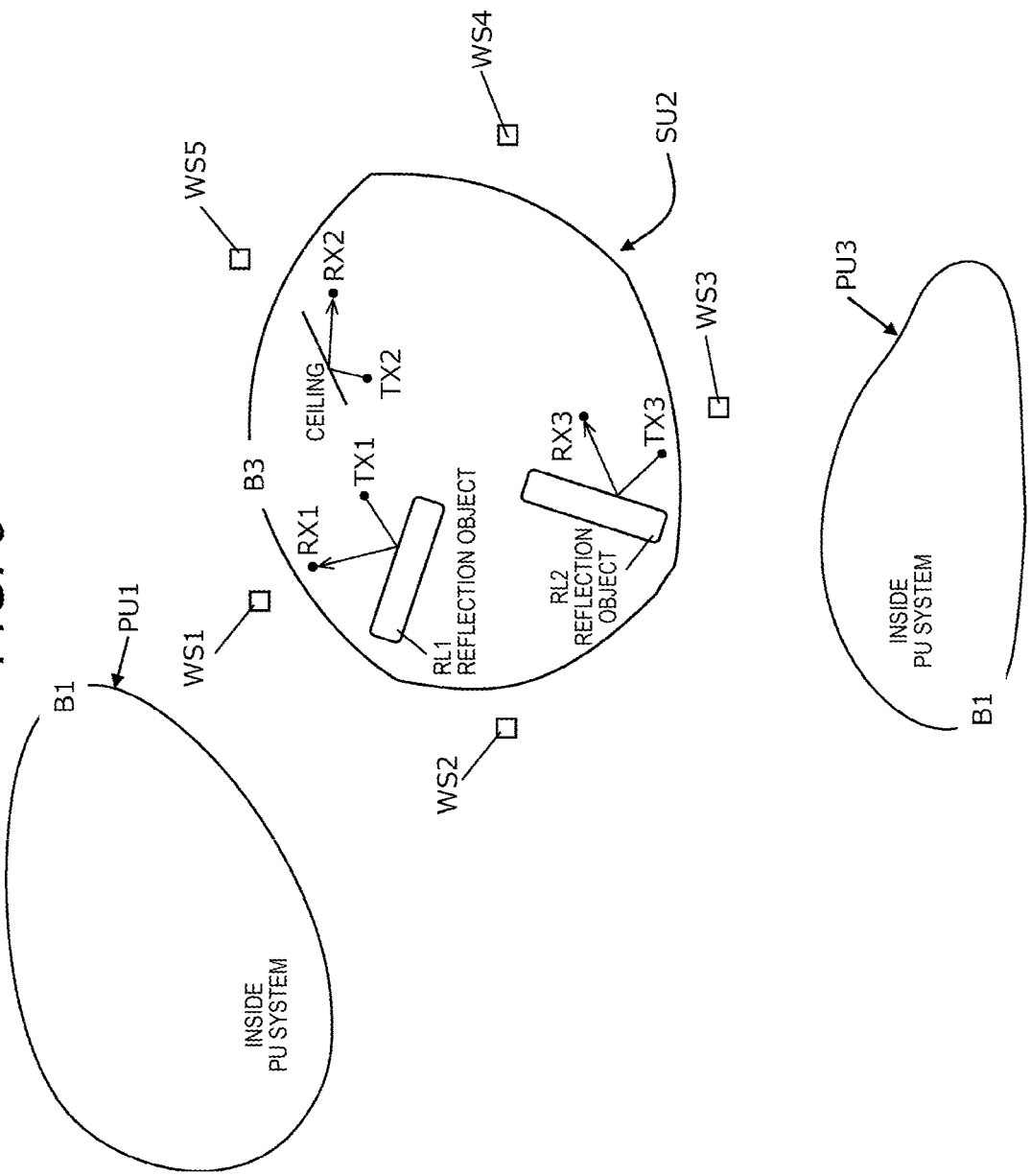
FIG. 5 is a diagram schematically illustrating a disposition example of a SU system and at least one PU system on the periphery thereof according to Exemplary Embodiment 2.

FIG. 5 is a diagram schematically illustrating a disposition example of SU system 3 and at least one PU system 1 on the periphery thereof according to Exemplary Embodiment 2. In FIG. 5, for example, three base stations TX1, TX2, and TX3 are disposed inside third border B3 corresponding to communication area SU2 of SU system 3. Wireless signals (so-called radio waves) transmitted from base stations TX1, TX2, and TX3 are respectively reflected at reflection object RL1, a ceiling, and reflection object RL2, disposed in SU system 3 so as to be received by reception points RX1, RX2, and RX3. Reception points RX1 to RX3 are wireless terminals (examples of terminals) such as smart phones accommodated in respective base stations TX1, TX2, and TX3 in SU system 3.

A plurality of (for example, five) radio wave sensors WS1, WS2, WS3, WS4, WS5 are disposed around third border B3 corresponding to communication area SU2 of SU system 3.

Radio wave sensors WS1 to WS5 as examples of sensors have the same functions as those of radio wave sensors 341 to 344 according to Exemplary Embodiment 1, respectively measure reception power of wireless signals (examples of signals) from base stations 351 to 35$k$ (refer to FIG. 6; k is an integer of 2 or greater) disposed in SU system 3, and report the measured reception power to base stations 351 to 35$k$ via SU system management apparatus 36. Radio wave sensors WS1 to WS5 respectively report measurement results of the reception power (reception levels) to base stations 351 to 35$k$. The measurement results of the reception power (reception levels) in radio wave sensors WS1 to WS5 are respectively input to processors of base stations 351 to 35$k$. The measurement of reception power in each of radio wave sensors WS1 to WS5 may be performed to monitor whether or not actual reception power of a wireless signal using carrier frequency $f_k$ permitted to be used in SU system 3 by shared frequency management apparatus 2 complies with reception power defined in a shared frequency use condition.

In FIG. 5, a border line (for example, refer to first border B1) connecting reception point positions where a reception sensitivity of a wireless signal from PU system PU1 or PU3 is obtained to each other is illustrated not to physically overlap communication area SU2 of SU system 3. Here, also in Exemplary Embodiment 2, shared frequency management apparatus 2 notifies SU system 3 of, for example, a carrier frequency, a bandwidth, and transmission power including a transmission directivity gain or allowable maximum reception level Ps (which will be described later) as shared frequency use conditions (refer to permission information S2 which will be described later). Therefore, SU system 3 cannot determine in which direction PU systems PU1 and PU3 are present when viewed from SU system 3.

However, the maximum transmission power for setting a level of a radio wave radiated to the outside of communication area SU2 due to transmission of a wireless signal (radio wave) in communication area SU2 (refer to third border B3) of SU system 3 to a predetermined allowable value or smaller may be variable depending on a beam direction (for example, 64 directions) with transmission directivity. Here, a level of a radio wave radiated to the outside of communication area SU2 is, for example, a measured value (monitored value) of a reception level in each of radio wave sensors WS1 to WS5 provided around third border B3.

Particularly, in a case where SU system 3 is an indoor space such as a factory, and a reflection path at such reflection objects RL1 and RL2 such as a ceiling or a wall is also used, there is a high probability that there may be a beam direction with transmission directivity capable of suppressing a level of a radio wave radiated to the outside of communication area SU2 (refer to third border B3). In other words, in a case where a value of transmission power including a transmission directivity gain in a direction in which interference given from SU system 3 has the greatest influence on the PU system can be set to be variable in each beam direction with transmission directivity of a radio wave when viewed from SU system 3, a radio resource can be adaptively allocated to a terminal accommodated in a base station of SU system 3 due to a direction, and thus a carrier frequency may be effectively used assuming that a shared frequency use condition of which a notification is sent from shared frequency management apparatus 2 is to be observed.

Figure 6:
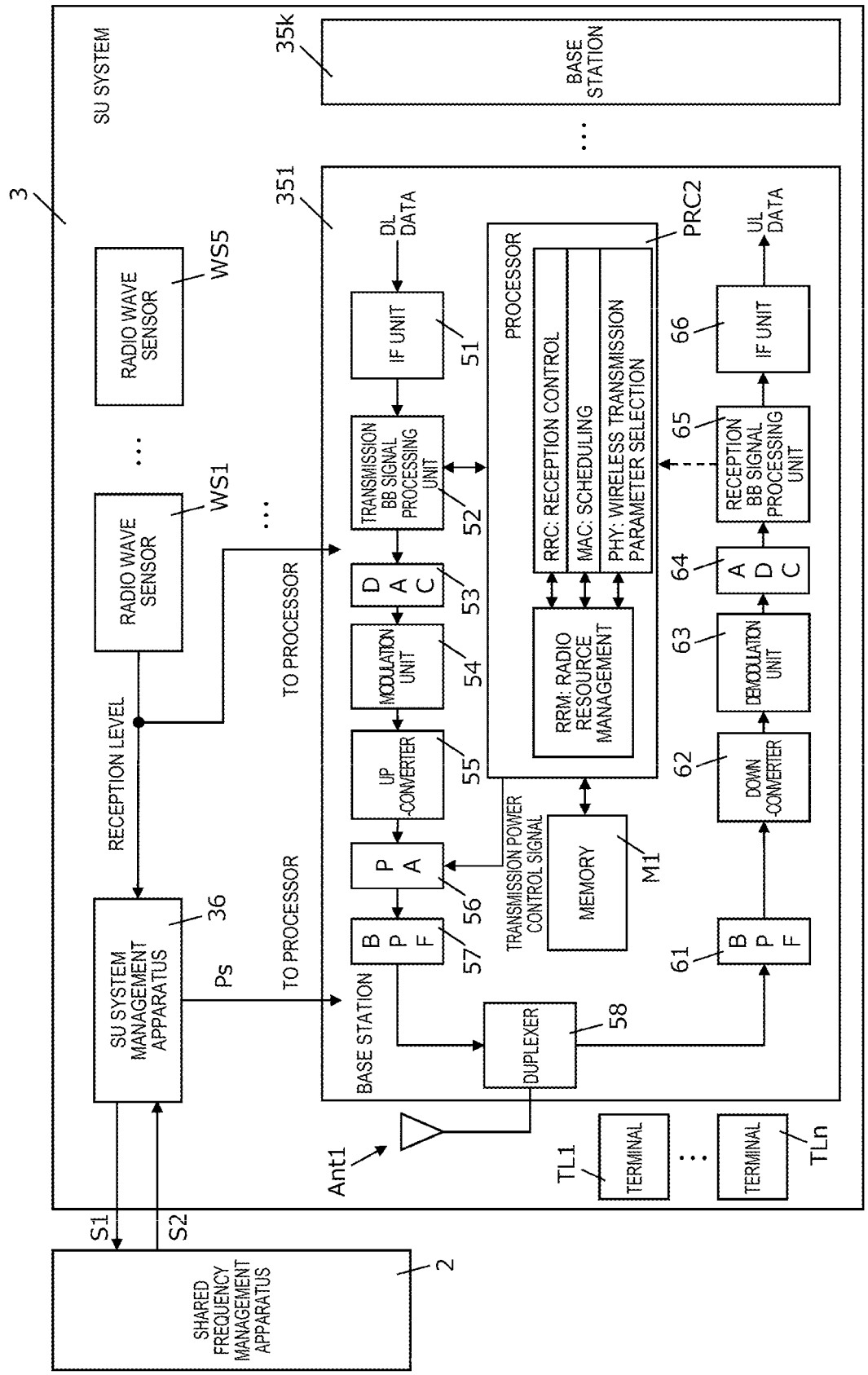
FIG. 6 is a block diagram illustrating a detailed internal configuration example of the SU system according to Exemplary Embodiment 2.

FIG. 6 is a block diagram illustrating a detailed internal configuration example of SU system 3 according to Exemplary Embodiment 2. SU system 3 illustrated in FIG. 6 is configured to include at least SU system management apparatus 36, radio wave sensors WS1 to WS5, and base stations 351 to 35k. Each of base stations 351 to 35k accommodates at least one of terminals TL1 to TLn. Here, n is an integer of 2 or greater. Herein, for better understanding of description, each of terminals TL1 to TLn is a wireless terminal such as a smart phone accommodated in base station 351 and performing wireless communication with, for example, base station 351. Each of terminals TL1 to TLn may not have an identical internal configuration as long as wireless communication with base station 351 can be performed. Each of terminals TL1 to TLn performs wireless communication with base station 351 by using a radio resource (for example, a resource block which will be described later) allocated by base station 351 on the basis of permission information S2 (which will be described later) of which a notification is sent from shared frequency management apparatus 2.

SU system management apparatus 36 may be configured by using, for example, a personal computer (PC). SU system management apparatus 36 applies to shared frequency management apparatus 2 for conditional use of some frequencies (for example, the 20 GHz to the 30 GHz band) of the predetermined shared frequency band mainly or substantially exclusively usable by PU system 1. Application information S1 sent to shared frequency management apparatus 2 during application includes, for example, at least a carrier frequency, a bandwidth, and transmission power including a transmission directivity gain. Application information S1 may further include third border B3 indicating a border line of a restricted area that is a communication area in which a wireless service of SU system 3 is received and a measurement result of reception power in a radio wave sensor (for example, radio wave sensors WS1 to WS5).

SU system management apparatus 36 as an example of an acquisition unit receives and acquires, from shared frequency management apparatus 2, permission information S2 indicating a shared frequency use condition determined by shared frequency management apparatus 2 in response to application information S1. Permission information S2 includes a carrier frequency, a bandwidth, and transmission power including a transmission directivity gain or allowable maximum reception level Ps. The transmission power including a transmission directivity gain indicates that, for example, "transmission power of a wireless signal (radio wave) sent from SU system 3 is reduced to a maximum of 30 dBi or less including the transmission directivity gain". On the other hand, allowable maximum reception level Ps indicates that, for example, "reception power of a wireless signal measured in each of radio wave sensors WS1 to WS5 is set to a maximum of −70 dBm" on the basis of disposition positions of radio wave sensors WS1 to WS5 in SU system 3 and transmission power including a transmission directivity gain. The transmission power including a transmission directivity gain is a sum of a gain when transmission directivity of a wireless signal transmitted from a base station (for example, base station 351) of SU system 3 is formed and transmission power of a wireless signal with a carrier frequency band, and is calculated by shared frequency management apparatus 2. On the other hand, allowable maximum reception level Ps is the maximum reception level allowed to minimize interference given to the PU system among reception levels of a radio wave measured in radio wave sensors WS1 to WS5, and is calculated by permission target frequency sharing condition determination unit 23 of shared frequency management apparatus 2 that can recognize disposition position information of radio wave sensors WS1 to WS5. SU system management apparatus 36 sends a calculation result of allowable maximum reception level Ps to each of base stations 351 to 35k. Allowable maximum reception level Ps is input to each of the processors of base stations 351 to 35k.

Internal configurations of base stations 351 to 35k are the same as each other, and, thus, herein, base station 351 will be described as an example. Base station 351 is configured to include IF unit 51, transmission baseband (BB) signal processing unit 52, digital/analog converter (DAC) 53, modulation unit 54, up-converter 55, power amplifier (PA) 56, bandpass filter (BPF) 57, duplexer 58, antenna Ant1, BPF 61, down-converter 62, demodulation unit 63, ADC 64, reception BB signal processing unit 65, IF unit 66, processor PRC2, and memory M1.

IF unit 51 acquires downlink (DL) data from, for example, a host apparatus (not illustrated) of base station 351, and sends the DL data to transmission BB signal processing unit 52. The host apparatus includes, for example, a radio network controller (RNC) or a serving gateway (S-GW).

Transmission BB signal processing unit 52 performs various signal processes (baseband signal processes) in a predefined baseband on the DL data from IF unit 51 on the basis of a control signal from processor PRC2. The baseband signal processes include, for example, an encoding process and transmission directivity control process (for example, a beam forming process).

DAC 53 converts the DL data subjected to the baseband signal processes in transmission BB signal processing unit 52 from digital data to an analog signal, so as to generate a transmission signal.

Modulation unit 54 modulates the transmission signal from DAC 53 according to a predetermined modulation method corresponding to a wireless parameter (which will be described later) selected by processor PRC2. The modulation method includes, for example, quadrature modulation. The quadrature modulation includes, for example, quadrature phase shift keying (QPSK) and quadrature amplified modulation (QAM).

Up-converter 55 increases a frequency band of the baseband transmission signal modulated by modulation unit 54, and thus generates a transmission signal with a carrier frequency band (RF band) included in permission information S2 of which a notification is sent from shared frequency management apparatus 2.

PA 56 amplifies signal power of the transmission signal with the RF bandwidth from up-converter 55 in association with a beam direction in response to a transmission power control signal generated by processor PRC2 on the basis of a wireless parameter (which will be described later) selected by processor PRC2, and maintains transmission power of the transmission signal to be equal to or less than allowable maximum reception level Ps.

BPF 57 causes a transmission signal in a predetermined frequency range on the basis of a carrier frequency and a bandwidth used in wireless communication between base station 351 and a terminal to pass therethrough, and thus filters the transmission signal so as to cut off a signal out of the predetermined frequency range.

Duplexer 58 as an example of a communication unit separates an input signal into, for example, a transmission signal or a received signal, and outputs the separated signal to a transmission system (for example, transmission BB signal processing unit 52, DAC 53, modulation unit 54, up-converter 55, PA 56, and BPF 57) or a reception system (for example, BPF 61, down-converter 62, demodulation unit 63, ADC 64, and reception BB signal processing unit 65). For example, duplexer 58 transmits (radiates) a transmission signal sent from the transmission system (refer to the above description), from antenna Ant1. Duplexer 58 outputs a received signal that is received by antenna Ant1 to the reception system (refer to the above description).

Antenna Ant1 as an example of a communication unit is configured with a plurality of antenna elements, and transmits (radiates) a transmission signal from the transmission system (refer to the above description) of base station 351 toward communication area SU2 of SU system 3.

BPF 61 causes a received signal in the predetermined frequency range (refer to the above description) on the basis of a carrier frequency and a bandwidth used in wireless communication between base station 351 and a terminal to pass therethrough, and thus filters the received signal so as to cut off a signal out of the predetermined frequency range. Although not illustrated in FIG. 6, a low noise amplifier (LNA) may be provided between BPF 61 and down-converter 62. The LNA amplifies a received signal with a carrier frequency band (RF band) from BPF 61.

Down-converter 62 reduces a frequency band of the received signal with the carrier frequency band from BPF 61 or the LNA (refer to the above description), and thus generates a received signal with the predefined baseband (refer to the above description).

Demodulation unit 63 demodulates the baseband received signal from down-converter 62 according to a predetermined demodulation method corresponding to a wireless parameter (which will be described later) selected by processor PRC2. The demodulation method includes, for example, quadrature demodulation (for example, QPSK or QAM) corresponding to the modulation method.

ADC 64 converts the received signal from demodulation unit 63 from an analog signal into digital data, so as to generate uplink (UL) data.

Reception BB signal processing unit 65 performs various signal processes (baseband signal processes) in a predefined baseband on the UL data from ADC 64. The baseband signal processes include, for example, a decoding process and reception directivity control process (for example, a beam forming process). Reception BB signal processing unit 65 outputs channel state information (CSI) reported from a terminal to processor PRC2.

IF unit 66 sends the UL data from reception BB signal processing unit 65 to the host apparatus (refer to the above description).

Processor PRC2 controls an operation of each unit of base station 351, and is configured by using a central processing unit (CPU), a digital signal processor (DSP), or a field programmable gate array (FPGA). Processor PRC2 integrally performs processes regarding wireless communication by controlling an operation of each unit of base station 351. Processor PRC2 functions as a control unit of base station 351, and performs a control process for totally controlling operations of the respective units of base station 351, data input and output processes among the respective units of base station 351, a data calculation process, and a data storage process. Processor PRC2 operates according to a program stored in a ROM of memory M1. For example, processor PRC2 generates a transmission power control signal for controlling transmission power of a transmission signal on the basis of a selected wireless parameter (which will be described later), and outputs the transmission power control signal to PA 56.

Processor PRC2 performs management (radio resource management: RRM) of a radio resource allocated during wireless communication with each of terminals TL1 to TLn accommodated in base station 351. Specifically, processor PRC2 performs processes such as reception control (radio resource control: RRC), scheduling (media access control: MAC), and wireless transmission parameter selection (physical layer: PHY). The reception control is a function of setting an upper limit of the number of wireless connection to base station 351, and controlling access from a terminal such that the number of connected terminals does not exceed the upper limit. The scheduling is a function of mapping (allocating) a subcarrier onto two dimensions having a frequency axis and a time axis of a downlink (DL) on the basis of channel state information (CSI) reported from each of a plurality of terminals. The wireless transmission parameter selection is a function for selecting a predetermined wireless parameter required for wireless communication (transmission) on the basis of permission information S2 sent from shared frequency management apparatus 2. The wireless parameter includes, for example, a carrier frequency, a bandwidth, transmission power including a transmission directivity gain or allowable maximum reception level Ps, a minimum transmission time interval (TTI), a subcarrier frequency interval, a cyclic prefix length, a subcarrier modulation method, and a subcarrier demodulation method.

Memory M1 is configured by using a random access memory (RAM) and a read only memory (ROM), and temporarily preserves a program required to perform an operation of base station 351, and data or information generated during an operation. The RAM is, for example, a work memory used during an operation of processor PRC2. The ROM stores in advance, for example, a program for controlling processor PRC2. Memory M1 stores beam data indicating correspondence relationships among a plurality of respective beam directions of wireless signals (radio waves) sent from base station 351 and measurement results of reception levels in radio wave sensors WS1 to WS5 (refer to FIG. 8).

Figure 7:
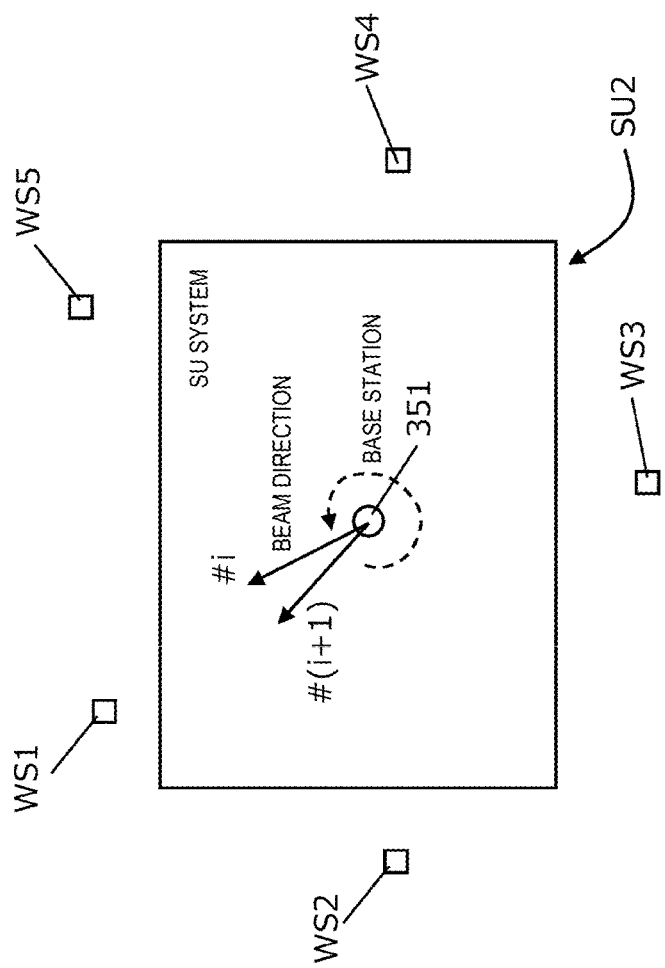
FIG. 7 is a diagram for describing reception power in a radio wave sensor in each beam direction.

Here, the beam data will be described with reference to FIGS. 7 and 8. FIG. 7 is a diagram for describing reception power in a radio wave sensor in each beam direction. FIG. 8 is a table illustrating an example of reception power in a radio wave sensor in each beam direction, previously measured before an actual operation. Here, a description will be made of an example in which five (that is, a plurality of) radio wave sensors WS1 to WS5 are provided as radio wave sensors, and thus five (that is, a plurality of) reception positions where radio wave sensors measure reception levels may be provided, but a plurality of radio wave sensors are not necessarily provided.

In FIG. 7, for better understanding of description, an outer shape of communication area SU2 of SU system 3 is a rectangular shape, but is not limited to the rectangular shape. As illustrated in FIG. 7, base station 351 transmits a wireless signal (hereinafter, referred to as a "wireless signal in beam direction #i") in which transmission directivity is formed in beam direction #i (where i is an identification number indicating a beam direction) in a stage before an actual operation of starting wireless communication with a terminal. Each of radio wave sensors WS1 to WS5 measures a reception level (reception power) when the wireless signal in beam direction #i is received, and outputs the reception level to base station 351 (refer to FIG. 6). Similarly, base station 351 transmits the next wireless signal in beam direction # (i+1). Each of radio wave sensors WS1 to WS5 measures a reception level (reception power) when the wireless signal in beam direction # (i+1) is received, and outputs the reception level to base station 351. Thereafter, base station 351 transmits transmittable wireless signals in all directions (for example, 64), acquires a measurement result of a reception level in each of radio wave sensors WS1 to WS5 for the wireless signals, generates table TBL1 for beam data illustrated in FIG. 8, and stores table TBL1 into memory M1.

As illustrated in FIG. 8, the beam data indicates correspondence relationships between each of all formable beam directions of a wireless signal (radio wave) sent from base station 351 and measurement results of reception levels when a corresponding wireless signal (radio wave) in a beam direction is received by radio wave sensors WS1 to WS5. For example, in beam direction #i, reception power (reception level) in radio wave sensor WS1 is RP11, reception power (reception levels) in respective radio wave sensors WS2 to WS4 are . . . (not described), and reception power (reception level) in radio wave sensor WS5 is RP51. For example, in beam direction # (i+1), reception power (reception level) in radio wave sensor WS1 is RP12, reception power (reception levels) in respective radio wave sensors WS2 to WS4 are . . . (not described), and reception power (reception level) in radio wave sensor WS5 is RP52.

Processor PRC2 as an example of a determination unit determines allowable maximum transmission power P(b) of a wireless signal (radio wave) in each beam direction on the basis of the beam data (refer to FIG. 8) included in permission information S2 (an example of a sharing condition) from shared frequency management apparatus 2. Here, b indicates a beam number. In other words, base station 351 obtains, in each beam direction, allowable maximum transmission power P(b) that is an index for determining a terminal disposed in a predetermined direction, to which a radio resource is allocated when viewed from base station 351, by taking into consideration a measurement result of a reception level of a wireless signal (radio wave) radiated in communication area SU2 of SU system 3, including the influence of a reflection object such as a wall, a ceiling, a pillar, or a window in the beam direction.

Processor PRC2 as an example of an allocation unit allocates a radio resource to a terminal on the basis of allowable maximum transmission power P(b) in each beam direction and channel state information (refer to the CSI) reported from the terminal. Details of the allocation will be described with reference to FIG. 9.

Figure 9:
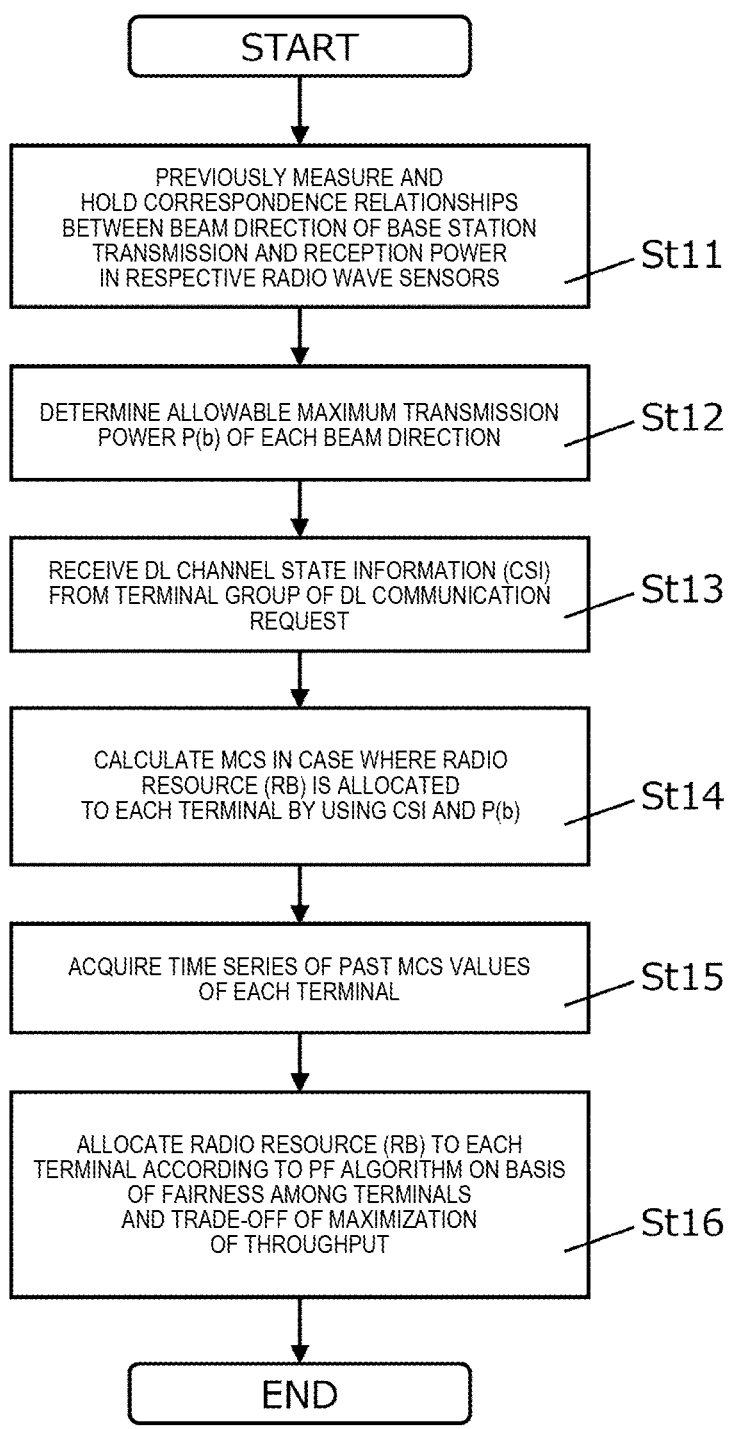
FIG. 9 is a flowchart illustrating operation procedures of a base station of the SU system according to Exemplary Embodiment 2.

Next, with reference to FIG. 9, a description will be made of operation procedures of base station 351 of SU system 3 according to Exemplary Embodiment 2. FIG. 9 is a flowchart illustrating operation procedures of base station 351 of SU system 3 according to Exemplary Embodiment 2. Each operation procedure illustrated in FIG. 9 is executed, for example, at a timing right before base station 351 starts wireless communication with a terminal.

In FIG. 9, base station 351 transmits a wireless signal (a "wireless signal in beam direction #i") in which transmission directivity is formed in beam direction #i in a stage before an actual operation of starting wireless communication with a terminal. Each of radio wave sensors WS1 to WS5 measures a reception level (reception power) when the wireless signal in beam direction #i is received, and outputs the reception level to base station 351 (St11). Similarly, base station 351 transmits the next wireless signal in beam direction # (i+1). Each of radio wave sensors WS1 to WS5 measures a reception level (reception power) when the wireless signal in beam direction # (i+1) is received, and outputs the reception level to base station 351 (St11). Thereafter, base station 351 transmits transmittable wireless signals in all directions (for example, 64), acquires a measurement result of a reception level in each of radio wave sensors WS1 to WS5 for the wireless signals, generates table TBL1 for beam data illustrated in FIG. 8, and stores table TBL1 into memory M1 (St11). Base station 351 may generate table TBL1 for beam data illustrated in FIG. 8 and store the table into memory M1 in a stage during the actual operation.

Base station 351 determines allowable maximum transmission power P(b) of a wireless signal (radio wave) in each beam direction on the basis of allowable maximum reception level Ps and the beam data (refer to FIG. 8) included in permission information S2 (an example of a sharing condition) from shared frequency management apparatus 2 (St12). Base station 351 stores determined allowable maximum transmission power P(b) into memory M1. Allowable maximum reception level Ps as a basis of step St12 is calculated by permission target frequency sharing condition determination unit 23 of shared frequency management apparatus 2 that can recognize disposition position information of radio wave sensors WS1 to WS5 and is included in permission information S2 of which a notification is sent from shared frequency management apparatus 2.

Each terminal of a terminal group (for example, TL1 to TLn) wirelessly connected to base station 351 receives a wireless signal (radio wave) in each beam direction, transmitted from base station 351 in step St11, and measures channel state information (refer to the CSI) indicating a state of a downlink propagation path of the wireless signal up to the reception thereof.

Here, the downlink (DL) is targeted on the basis of the following reasons, and is also the same for subsequent Exemplary Embodiment 3 or a modification example thereof. Specifically, in a case where an uplink (UL) is supposed, a terminal performs omni-transmission of uniformly transmitting radio waves that are not strong in directions of 360 degrees, and base station 351 receives the radio waves after forming reception directivity of the radio waves in a position of the terminal through reception beam forming. Thus, in the uplink (UL), there is less necessity to take into consideration interference given to a PU system from SU system 3. On the other hand, in the downlink (DL), a terminal similarly performs omni-reception in directions of 360 degrees, base station 351 is required to radiate a radio wave with strong transmission directivity, and thus it is necessary to take into consideration interference given to a PU system.

Each of terminals TL1 to TLn reports, to base station 351, a measurement result of channel state information of the propagation path (downlink) up to reception of a wireless signal (radio wave) in each beam direction. Base station 351 receives and acquires the channel state information (refer to the CSI) of the downlink from each terminal of the terminal group (for example, terminals TL1 to TLn) making a request for downlink (DL) wireless communication (St13).

Base station 351 calculates a modulation and coding scheme (MCS) in a case where a radio resource (for example, a resource block) is allocated to each terminal that is being wirelessly connected by using allowable maximum transmission power P(b) of the wireless signal (radio wave) in each beam direction determined in step St12 and the channel state information (refer to the CSI) in each beam direction of the wireless signal acquired in step St13 (St14). In other words, base station 351 calculates the MCS that is an existing wireless parameter on the basis of the channel state information of the downlink (DL) and allowable maximum transmission power P(b) based on consideration of given interference, allocates a radio resource on the basis of a well-known proportional fairness (PF) algorithm in a process in each of steps St15 and St16 after step St14, and can thus improve compatibility with an existing radio resource allocation process.

Base station 351 reads and acquires a time series of past MCS values (in other words, a plurality of values of the MCS corresponding to a predetermined past time) of each terminal from memory M1 (St15). Memory M1 stores a time series of past MCS values (in other words, a plurality of values of the MCS corresponding to a predetermined past time) of each terminal.

Base station 351 performs a process of allocating a radio resource (for example, a resource block) to each corresponding terminal according to the existing PF algorithm, by using the instantaneous (latest) MCS value of each terminal calculated in step St14 and the time series of past MCS values of each terminal acquired in step St15 (St16). In other words, base station 351 preferentially allocates a radio resource to a terminal of which a ratio between the instantaneous (latest) MCS value of each terminal and an average value of the plurality of MCS values corresponding to the predetermined past time is relatively high. Consequently, when wireless communication using some shared frequencies mainly or substantially exclusively used by a PU system is performed, base station 351 can uniformize an allocation frequency of a radio resource to each of terminals TL1 to TLn that are wirelessly connected according to the PF algorithm such that fairness is ensured among the terminals, and can thus realize effective use of the shared frequencies by uniformly allocating the radio resource.

As mentioned above, SU system 3 (an example of a wireless system) according to Exemplary Embodiment 2 can use a shared frequency mainly used by existing PU system 1 (an example of a first wireless system), under a predetermined sharing condition. SU system 3 performs wireless communication with each of at least one of terminals TL1 to TLn accommodated in communication area SU2, includes a plurality of radio wave sensors WS1 to WS5 that are disposed around communication area SU2 and measure reception power of a wireless signal sent from the inside of communication area SU2 via a communication unit, and stores beam data indicating correspondence relationships between a beam direction of the wireless signal and the measurement results of the respective radio wave sensors, into memory M1. SU system 3 determines allowable maximum transmission power P(b) of a wireless signal in each beam direction on the basis of permission information S2 (an example of a sharing condition) and the beam data, and allocates a radio resource to a terminal on the basis of allowable maximum transmission power P(b) in each beam direction and channel state information reported from the terminal.

Consequently, SU system 3 according to Exemplary Embodiment 2 can adaptively control transmission power according to a direction (for example, a beam direction) of wireless communication when at least some shared frequencies preferentially usable by PU system 1 are used by SU system 3 in communication area SU2. Therefore, even in a case where a physical positional relationship of PU system 1 cannot be recognized, SU system 3 can reduce a probability of the occurrence of an incident (for example, a wave stop command) of giving excessive interference to PU system 1 due to wireless communication using a shared frequency in communication area SU2, and can thus suppress a reduction of use efficiency of a shared frequency in communication area SU2.

SU system 3 acquires permission information S2 including allowable maximum reception level Ps (an example of allowable transmission power) of a wireless signal calculated to the extent of avoiding interference with PU system 1, from shared frequency management apparatus 2 connected to PU system 1. SU system 3 determines allowable maximum transmission power P(b) in each beam direction on the basis of allowable maximum reception level Ps and beam data. Consequently, SU system 3 can obtain an upper limit of allowable transmission power to the extent to which interference given to PU system 1 can be minimized, in each beam direction of a radio wave radiated from base station 351.

SU system 3 receives channel state information in each beam direction of a wireless signal from a terminal, and allocates a radio resource to the terminal on the basis of allowable maximum transmission power in each beam direction and the channel state information in each beam direction reported from the terminal. Consequently, SU system 3 can preferentially allocate a radio resource to a terminal in which the maximization of throughput is expected while reducing an interference area given to PU system 1 in light of channel state information of a downlink (DL) between base station 351 and the terminal.

SU system 3 calculates a wireless parameter (for example, an MCS value) corresponding to a radio resource by using allowable maximum transmission power in each beam direction and channel state information reported from a terminal, and allocates the radio resource to the terminal on the basis of a ratio between an MCS value based on the latest channel state information in the terminal and an average value of MCS values based on average channel state information corresponding to a predetermined past time in the terminal. Consequently, SU system 3 can efficiently allocate a radio resource to a terminal while reducing an interference area given to PU system 1 in light of channel state information of a downlink (DL) between base station 351 and the terminal and also satisfying the fairness of allocation of a radio resource among individual terminals such that the maximization of throughput is expected.

Permission information S2 (an example of a sharing condition) includes a carrier frequency, a bandwidth, and allowable maximum reception level Ps (an example of allowable maximum reception power) of a wireless signal in each of radio wave sensors WS1 to WS5, calculated to the extent of minimizing interference given to PU system 1. Consequently, even though SU system 3 is not notified of information indicating a physical position of PU system 1, SU system 3 can select a wireless parameter (refer to the above description) for minimizing interference given to PU system 1, and can thus stably perform wireless communication using a shared frequency in communication area SU2.

Exemplary Embodiment 3

In Exemplary Embodiment 3, in the same manner as in Exemplary Embodiment 2, a description will be made of examples of a wireless system capable of using a shared frequency and a radio resource allocation method in wireless communication using a shared frequency, capable of suppressing a reduction of use efficiency of a shared frequency by adaptively controlling transmission power according to a direction of wireless communication when at least some shared frequencies preferentially usable by a PU system are used by a SU system.

In a configuration of a shared frequency management system according to Exemplary Embodiment 3, the same configuration as the configuration of the shared frequency management system according to each of Exemplary Embodiments 1 and 2 will be given the same reference numeral, and a description thereof will be made briefly or will be omitted, and different contents will be described.

FIG. 11 is a diagram schematically illustrating a disposition example of SU system 3A and two PU systems PU3 and PU4 on the periphery thereof according to Exemplary Embodiment 3. Although not illustrated in FIG. 11, in FIG. 11, for example, three base stations TX1, TX2, and TX3 (refer to FIG. 5) are disposed inside third border B3 corresponding to communication area SU2 of SU system 3A. For example, base stations TX1 to TX3 have the same configuration as that of any one of base stations 351 to 35k illustrated in FIG. 12. Wireless signals (so-called radio waves) transmitted from base stations TX1, TX2, and TX3 are reflected at reflection objects and a ceiling disposed in SU system 3A, and are respectively received by reception points RX1, RX2, and RX3 (refer to FIG. 5). Reception points RX1 to RX3 are wireless terminals (examples of terminals) such as smart phones accommodated in respective base stations TX1, TX2, and TX3 in SU system 3A.

The shared frequency management system according to Exemplary Embodiment 3 derives second border B2 around communication area SU2 of SU system 3A, not to overlap first borders B1 that are borders of reception sensitivities of PU systems PU3 and PU4.

First borders B1 are borders (in other words, reception sensitivity borders) of allowable interference levels of PU systems PU3 and PU4. A shape of first border B1 is not necessarily a circular shape, and is set by taking into consideration topography or a feature (for example, a building) in an area of each of PU systems PU3 and PU4.

Second border B2 for which an upper limit value of "transmission power+transmission directivity gain" is permitted in SU system 3A having the inside of third border B3 as a service area of wireless communication is a substantially circular border of an allowable interference level centering on third border B3, and is derived, for example, according to the method described in Exemplary Embodiment 1.

Third border B3 is a service area (a so-called communication area) of wireless communication of SU system 3A.

As illustrated in an upper part of FIG. 11, in a case where SU system 3A transmits a signal at an upper limit value of "transmission power+transmission directivity gain" corresponding to second border B2 in directions DRC1 and DRC2 of being closest to first border B1 of each of PU systems PU3 and PU4 from the communication area (for example, a central location), interference of the allowable interference level may reach to each of PU systems PU3 and PU4.

Therefore, in Exemplary Embodiment 3, when a transmission signal (that is, a radio wave) is transmitted, SU system 3A specifies a direction (that is, transmission direction θ) in which an upper limit value of "transmission power+transmission directivity gain" is determined, and derives allowable maximum transmission power P(θ) when a transmission signal is sent in specified transmission direction θ. SU system 3A performs management of a radio resource in base station 351 (refer to FIG. 12) of SU system 3A on the basis of allowable maximum transmission power P(θ). Consequently, SU system 3A can perform wireless communication using allowable maximum transmission power P(θ) in each transmission direction θ to the extent of not giving interference of the allowable interference level to first border B1 of each of PU systems PU3 and PU4 when a transmission signal is sent from the communication area (for example, a central location). For example, as illustrated in a lower part of FIG. 11, SU system 3A can send a transmission signal with transmission power exceeding the upper limit value of "transmission power+transmission directivity gain" in transmission direction θ (that is, a direction that is different from directions DRC1 and DRC2) in which distance D(θ) from the communication area (for example, a central location) to first border B1 of each of PU systems PU3 and PU4 is not the minimum. In other words, SU system 3A can spuriously enlarge a size of an area of second border B2 from region BFB2 to region AFB2.

Figure 12:
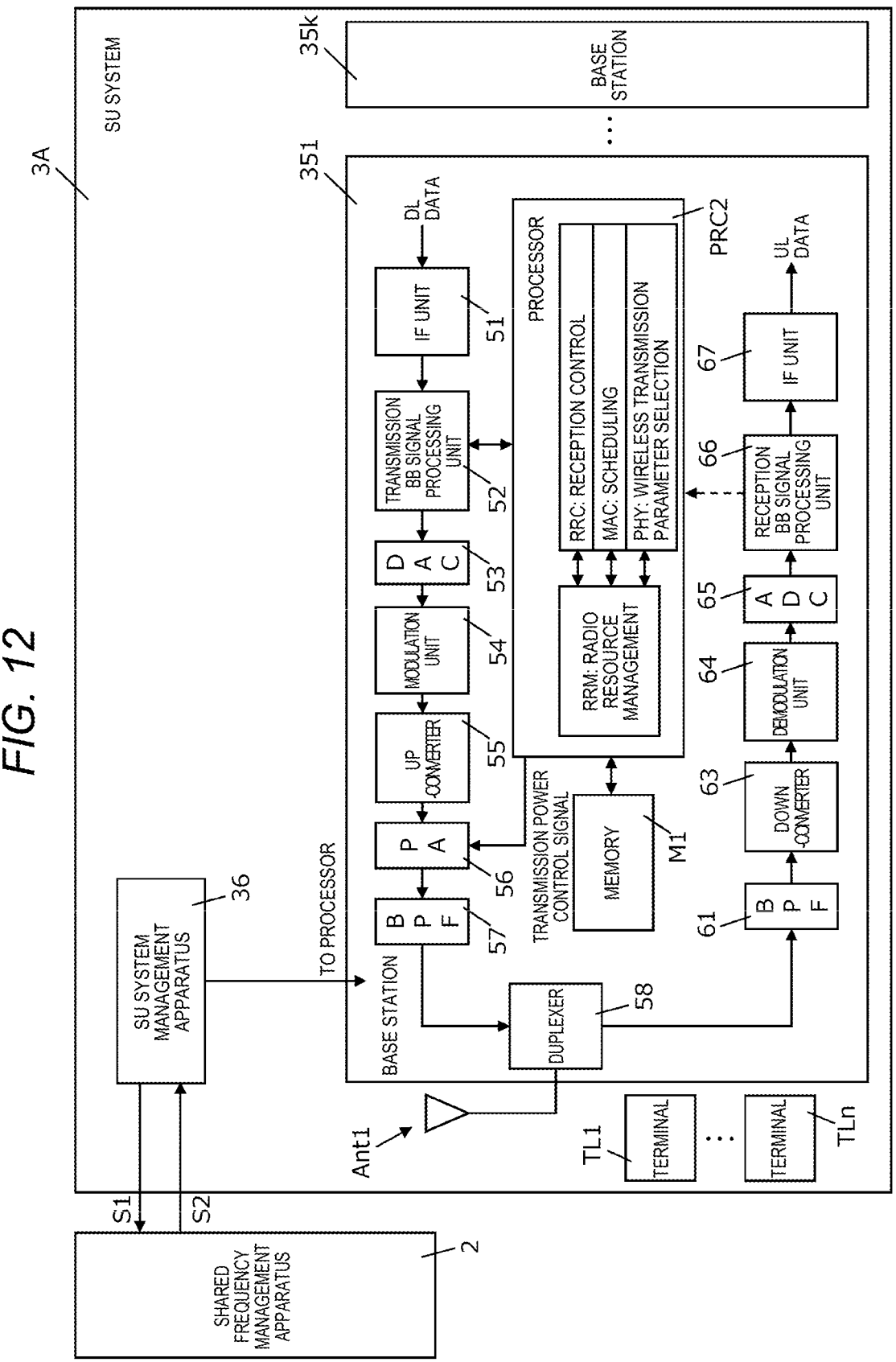
FIG. 12 is a block diagram illustrating a detailed internal configuration example of the SU system according to Exemplary Embodiment 3.

FIG. 12 is a block diagram illustrating a detailed internal configuration example of SU system 3A according to Exemplary Embodiment 3. A configuration difference between SU system 3A according to Exemplary Embodiment 3 and SU system 3 according to Exemplary Embodiment 2 is that radio wave sensors WS1 to WS5 are omitted (refer to FIG. 2), and other configurations are the same as each other, and thus detailed description thereof will not be repeated. In Exemplary Embodiment 3, an operation of each of base stations 351 to 35k is different from that of each of base stations 351 to 35k according to Exemplary Embodiment 2.

Figure 13:
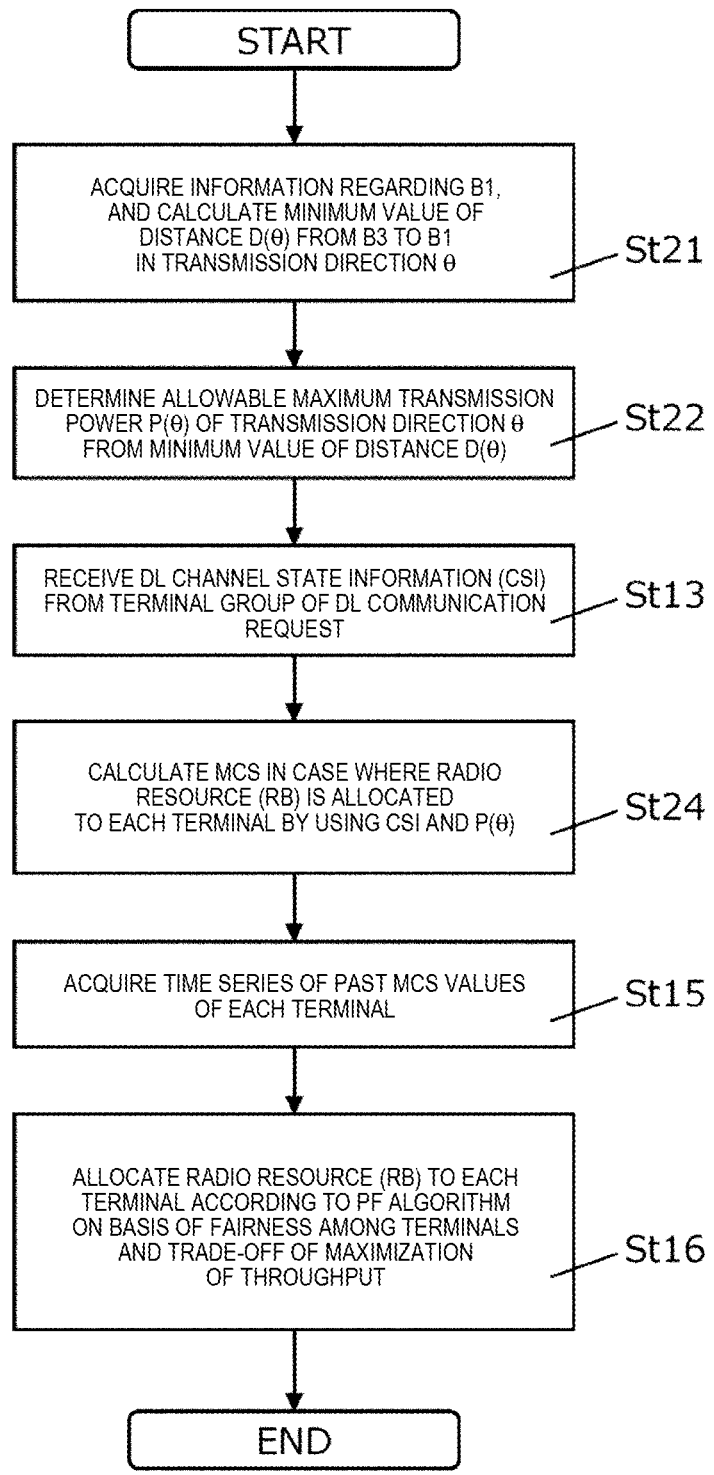
FIG. 13 is a flowchart illustrating operation procedures of a base station of the SU system according to Exemplary Embodiment 3.

Next, with reference to FIG. 13, a description will be made of operation procedures of base station 351 of SU system 3A according to Exemplary Embodiment 3. FIG. 13 is a flowchart illustrating operation procedures of base station 351 of SU system 3A according to Exemplary Embodiment 3. In a description of FIG. 13, a content overlapping the description of FIG. 9 will be given an identical step number, and a description thereof will be made briefly or will be omitted. Each operation procedure illustrated in FIG. 13 is executed, for example, at a timing right before base station 351 starts wireless communication with a terminal.

In FIG. 13, base station 351 (for example, processor PRC2) acquires information regarding first border B1 of each of PU systems PU3 and PU4, sent from shared frequency management apparatus 2, via SU system management apparatus 36 (St21). Base station 351 calculates the minimum value of distance D(θ) from third border B3 (that is, a communication area of SU system 3A) to first border B1 of each of PU systems PU3 and PU4 in each transmission direction θ by using the information (for example, position information of an area of each of PU systems PU3 and PU4) regarding first border B1 of each of PU systems PU3 and PU4 (St21). Base station 351 preserves information (for example, position information of an area of SU system 3A) regarding third border B3 in memory M1. Transmission direction θ in which distance D(θ) is the minimum is directions DRC1 and DRC2 (that is, a direction in which a distance from third border B3 to first border B1 of each of PU systems PU3 and PU4 is the minimum) illustrated in FIG. 11.

Base station 351 calculates and determines allowable maximum transmission power P(θ) corresponding to transmission direction θ in which the minimum value of distance D(θ) calculated in step St21 is obtained (St22). Each of terminals TL1 to TLn reports a measurement result of channel state information of a propagation path (downlink) up to reception of a wireless signal (radio wave) in each transmission direction θ from base station 351, to base station 351. Base station 351 receives and acquires the channel state information (refer to the CSI) of the downlink from each terminal of the terminal group (for example, terminals TL1 to TLn) making a request for downlink (DL) wireless communication (St13).

Base station 351 calculates an MCS in a case where a radio resource (for example, a carrier frequency or a resource block) is allocated to each terminal that is being wirelessly connected by using allowable maximum transmission power P(θ) of the wireless signal (radio wave) determined in step St22 and the channel state information (refer to the CSI) in each transmission direction θ of the wireless signal acquired in step St13 (St24). In other words, base station 351 calculates the MCS that is an existing wireless parameter on the basis of the channel state information of the downlink (DL) and allowable maximum transmission power P(θ) based on consideration of given interference, allocates a radio resource to a terminal on the basis of a PF algorithm in a process in each of steps St15 and St16 after step St24, and can thus improve compatibility with an existing radio resource allocation process.

Base station 351 reads and acquires a time series of past MCS values (in other words, a plurality of values of the MCS corresponding to a predetermined past time) of each terminal from memory M1 (St15). Memory M1 stores a time series of past MCS values (in other words, a plurality of values of the MCS corresponding to a predetermined past time) of each terminal.

Base station 351 performs a process of allocating a radio resource (for example, a carrier frequency or a resource block) to each corresponding terminal according to the existing PF algorithm, by using the instantaneous (latest) MCS value of each terminal calculated in step St24 and the time series of past MCS values of each terminal acquired in step St15 (St16). In other words, base station 351 preferentially allocates a radio resource to a terminal of which a ratio between the instantaneous (latest) MCS value of each terminal and an average value of the plurality of MCS values corresponding to the predetermined past time is relatively high. Consequently, when wireless communication using some shared frequencies mainly or substantially exclusively used by a PU system is performed, base station 351 can uniformize an allocation frequency of a radio resource to each of terminals TL1 to TLn that are wirelessly connected according to the PF algorithm such that fairness is ensured among the terminals, and can thus realize effective use of the shared frequencies by uniformly allocating the radio resource.

As mentioned above, SU system 3A (an example of a wireless system) according to Exemplary Embodiment 3 can use a shared frequency mainly used by an existing first wireless system, under a predetermined sharing condition. SU system 3A performs wireless communication with each of at least one of terminals TL1 to TLn accommodated in communication area SU2, and acquires information regarding a reception sensitivity border (for example, first border B1) of each of PU systems PU3 and PU4. SU system 3A causes base station 351 (for example, processor PRC2 as an example of a direction determination unit) to derive transmission direction θ of a signal in which a distance from communication area SU2 of SU system 3A to the reception sensitivity border of each of PU systems PU3 and PU4 by using the information regarding the reception sensitivity borders of PU systems PU3 and PU4. SU system 3A causes base station 351 (for example, processor PRC2 as an example of a power determination unit) to derive allowable maximum transmission power P(θ) of derived transmission direction θ of the signal. SU system 3A allocates a radio resource to a terminal on the basis of allowable maximum transmission power P(θ) and channel state information (refer to the CSI) reported from the terminal.

Consequently, SU system 3A can perform management of a radio resource in base station 351 (refer to FIG. 12) of SU system 3A by taking into consideration allowable maximum transmission power P(θ) in transmission direction θ in which distance D(θ) from communication area SU2 (for example, a central location) to first border B1 of each of PU systems PU3 and PU4. Therefore, SU system 3A can perform wireless communication using allowable maximum transmission power P(θ) in each transmission direction θ to the extent of not giving interference of the allowable interference level to first border B1 of each of PU systems PU3 and PU4 when a transmission signal is sent from communication area SU2 (for example, a central location). In other words, SU system 3A can send a transmission signal with transmission power exceeding an upper limit value of "transmission power+transmission directivity gain" in transmission direction θ (that is, a direction that is different from directions DRC1 and DRC2) in which distance D(θ) from communication area SU2 (for example, a central location) to first border B1 of each of PU systems PU3 and PU4 is not the minimum. In other words, SU system 3A can spuriously enlarge a size of an area of second border B2 from region BFB2 to region AFB2.

SU system 3A calculates a wireless parameter (for example, an MCS value) corresponding to a radio resource by using allowable maximum transmission power $P(\theta)$ and channel state information reported from a terminal, and allocates the radio resource to the terminal on the basis of a ratio between an MCS value based on the latest channel state information in the terminal and an average value of MCS values based on average channel state information corresponding to a predetermined past time in the terminal. Consequently, SU system 3A can efficiently allocate a radio resource to a terminal while reducing an interference area given to PU systems PU3 and PU4 in light of channel state information of a downlink (DL) between base station 351 and the terminal and also satisfying the fairness of allocation of a radio resource among individual terminals such that the maximization of throughput is expected.

Modification Example of Exemplary Embodiment 3

In a configuration of a shared frequency management system according to a modification example of Exemplary Embodiment 3, the same configuration as the configuration of the shared frequency management system according to each of Exemplary Embodiments 1, 2, and 3 will be given the same reference numeral, and a description thereof will be made briefly or will be omitted, and different contents will be described.

In Exemplary Embodiment 3, SU system 3A may acquire information (for example, position information of an area of each of PU systems PU3 and PU4) regarding first border B1 of each of PU systems PU3 and PU4. However, the information regarding first border B1 of each of PU systems PU3 and PU4 may have confidentiality, and thus the fact that third-party SU system 3A is notified of the information regarding first border B1 when viewed from PU systems PU3 and PU4 may be practically accompanied by security difficulties. For example, positions where a transmitter and a receiver of a base station or the like used in a PU system may be information with high confidentiality depending on PU systems.

Therefore, in the modification example of Exemplary Embodiment 3, it is assumed that SU system 3A cannot acquire information (for example, position information of an area of each of PU systems PU3 and PU4) regarding first border B1 of each of PU systems PU3 and PU4, but can acquire a shared frequency use condition (refer to the above description) sent from shared frequency management apparatus 2. Here, in the same manner as in Exemplary Embodiment 2, the shared frequency use condition (refer to permission information S2) includes, for example, a carrier frequency, a bandwidth, and transmission power (that is, "transmission power+transmission directivity gain") including a transmission directivity gain as a function of transmission direction $\theta$. In other words, in the modification example of Exemplary Embodiment 3, shared frequency management apparatus 2 calculates transmission power including a transmission directivity gain as a function of transmission direction $\theta$ as the shared frequency use condition, and notifies SU system 3A thereof.

In the modification example of Exemplary Embodiment 3, SU system 3A derives a difference between "transmission power+transmission directivity gain" (that is, allowable maximum transmission power $P(\theta)$) as a function of transmission direction $\theta$ included in the shared frequency use condition and the minimum allowable maximum transmission power $P(\theta0)$ corresponding to transmission direction $\theta0$ in which allowable maximum transmission power $P(\theta)$ is the minimum. SU system 3A derives an added SINR obtained by adding the difference (that is, "allowable maximum transmission power $P(\theta)$ −minimum allowable maximum transmission power $P(\theta0)$") to a signal to interference and noise ratio (SINR) [dB] between each of terminals TL1 to TLn and base station 351. SU system 3A performs management of a radio resource in base station 351 (refer to FIG. 12) of SU system 3A on the basis of the added SINR. Consequently, SU system 3A can perform wireless communication using allowable maximum transmission power $P(\theta0)$ in each transmission direction $\theta$ to the extent of not giving interference of the allowable interference level to first border B1 of each of PU systems PU3 and PU4 when a transmission signal is sent from the communication area (for example, a central location). For example, as illustrated in a lower part of FIG. 11, SU system 3A can send a transmission signal with transmission power exceeding the upper limit value of "transmission power+transmission directivity gain" in transmission direction $\theta$ (that is, a direction that is different from directions DRC1 and DRC2) in which distance $D(\theta)$ from the communication area (for example, a central location) to first border B1 of each of PU systems PU3 and PU4 is not the minimum. In other words, SU system 3A can spuriously enlarge a size of an area of second border B2 from region BFB2 to region AFB2.

Figure 14:
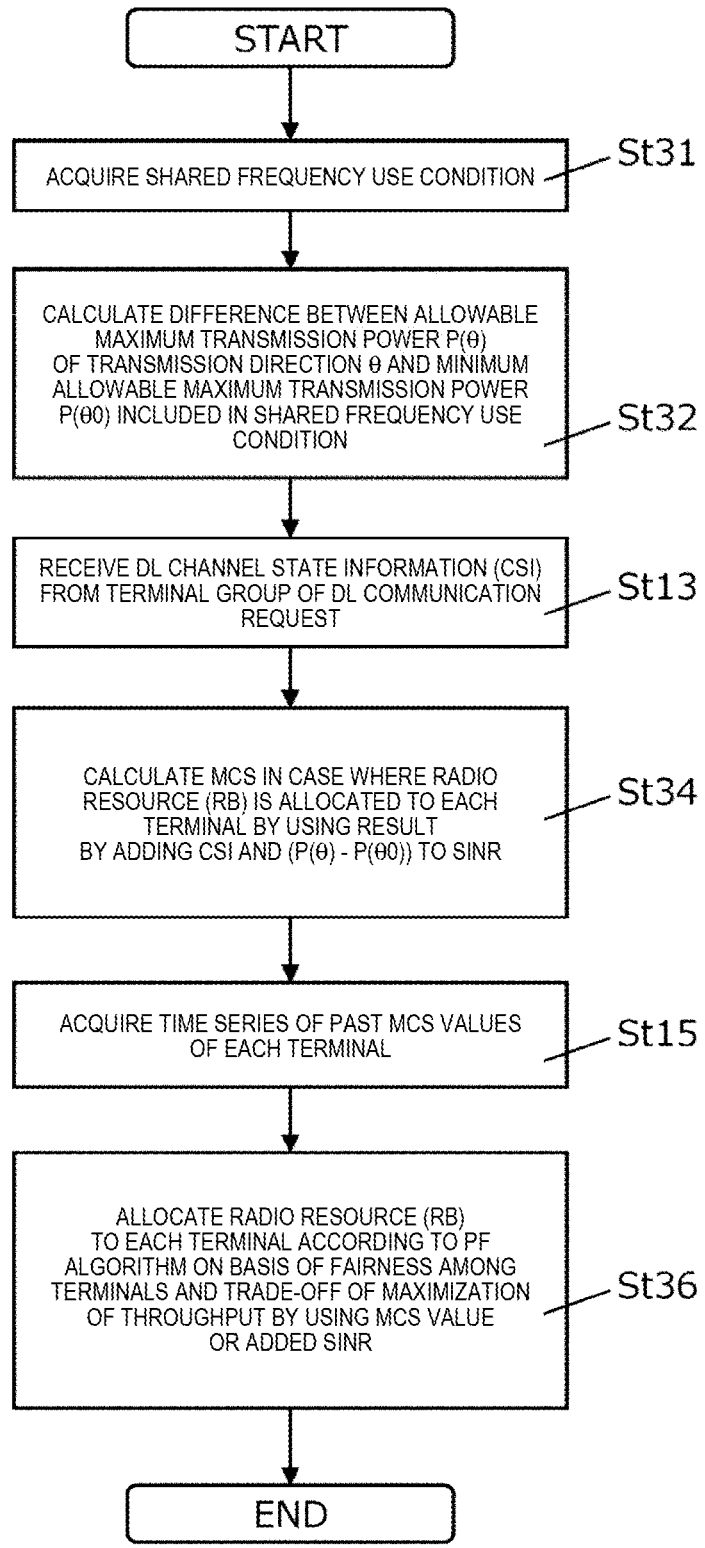
FIG. 14 is a flowchart illustrating operation procedures of a base station of the SU system according to a modification example of Exemplary Embodiment 3.

Next, with reference to FIG. 14, a description will be made of operation procedures of base station 351 of SU system 3A according to the modification example of Exemplary Embodiment 3. FIG. 14 is a flowchart illustrating operation procedures of the base station of the SU system according to the modification example of Exemplary Embodiment 3. In a description of FIG. 14, a content overlapping the description of FIG. 9 or 13 will be given an identical step number, and a description thereof will be made briefly or will be omitted. Each operation procedure illustrated in FIG. 14 is executed, for example, at a timing right before base station 351 starts wireless communication with a terminal.

In FIG. 14, base station 351 (for example, processor PRC2) acquires shared frequency use conditions (for example, a carrier frequency, a bandwidth, and "transmission power+transmission directivity gain" as a function of transmission direction $\theta$) sent from shared frequency management apparatus 2 (St31). Base station 351 calculates a difference between allowable maximum transmission power $P(\theta)$ and minimum allowable maximum transmission power $P(\theta0)$ included in the shared frequency use conditions (St32). Each of terminals TL1 to TLn reports a measurement result of channel state information of a propagation path (downlink) up to reception of a wireless signal (radio wave) in each transmission direction $\theta$ from base station 351, to base station 351. Base station 351 receives and acquires the channel state information (refer to the CSI) of the downlink from each terminal of the terminal group (for example, terminals TL1 to TLn) making a request for downlink (DL) wireless communication (St13).

Base station 351 calculates an MCS in a case where a radio resource (for example, a carrier frequency or a resource block) is allocated to each terminal that is being wirelessly connected by using an added SINR obtained by adding the difference (that is, "allowable maximum transmission power $P(\theta)$−minimum allowable maximum transmission power $P(\theta0)$") calculated in step St32 to an SINR between each of terminals TL1 to TLn and base station 351 and the channel state information (refer to the CSI) in each transmission direction θ of the wireless signal acquired in step St13 (St34). In other words, base station 351 calculates the MCS that is an existing wireless parameter on the basis of the channel state information of the downlink (DL) and the added SINR based on consideration of given interference, allocates a radio resource on the basis of a PF algorithm in a process in each of steps St15 and St36 after step St34, and can thus improve compatibility with an existing radio resource allocation process.

Base station 351 reads and acquires a time series of past MCS values (in other words, a plurality of values of the MCS corresponding to a predetermined past time) of each terminal from memory M1 (St15). Memory M1 stores a time series of past MCS values (in other words, a plurality of values of the MCS corresponding to a predetermined past time) of each terminal.

Base station 351 performs a process of allocating a radio resource (for example, a carrier frequency or a resource block) to each corresponding terminal according to the existing PF algorithm, by using the instantaneous (latest) MCS value of each terminal based on the added SINR, calculated in step St34 and the time series of past MCS values, or the added SINR (St36). In other words, base station 351 preferentially allocates a radio resource to a terminal of which a ratio between the instantaneous (latest) MCS value or the added SINR of each terminal and an average value of the plurality of MCS values or added SINRs corresponding to the predetermined past time is relatively high. Consequently, when wireless communication using some shared frequencies mainly or substantially exclusively used by a PU system is performed, base station 351 can uniformize an allocation frequency of a radio resource to each of terminals TL1 to TLn that are wirelessly connected according to the PF algorithm such that fairness is ensured among the terminals, and can thus realize effective use of the shared frequencies by uniformly allocating the radio resource.

As mentioned above, SU system 3A (an example of a wireless system) according to the modification example of Exemplary Embodiment 3 can use a shared frequency mainly used by an existing first wireless system, under a predetermined sharing condition. SU system 3A performs wireless communication with each of at least one of terminals TL1 to TLn accommodated in communication area SU2, and acquires sharing conditions (for example, shared frequency use conditions) including allowable transmission power (for example, allowable maximum transmission power $P(\theta)$ as a function of transmission direction θ) of a signal calculated to the extent of avoiding interference with PU systems PU3 and PU4, from shared frequency management apparatus 2 that is communicably connected to PU systems PU3 and PU4. SU system 3A causes base station 351 (for example, processor PRC2 as an example of a direction determination unit) to derive transmission direction θ0 of a signal in which a distance from communication area SU2 to a reception sensitivity border of each of PU systems PU3 and PU4 is the minimum by using the sharing conditions. SU system 3A causes base station 351 (for example, processor PRC2 as an example of a direction determination unit) to derive a difference between allowable maximum transmission power (for example, minimum allowable maximum transmission power $P(\theta 0)$) of the signal in derived transmission direction θ0 of the signal and allowable transmission power (for example, allowable maximum transmission power $P(\theta)$) of the signal. SU system 3A allocates a radio resource to a terminal on the basis of the difference and channel state information reported from the terminal.

Consequently, SU system 3A can perform management of a radio resource in base station 351 (refer to FIG. 12) of SU system 3A by taking into consideration the difference between minimum allowable maximum transmission power $P(\theta 0)$ in transmission direction θ0 in which allowable maximum transmission power $P(\theta)$ included in shared frequency use conditions of which a notification is sent from shared frequency management apparatus 2 is the minimum and allowable maximum transmission power $P(\theta)$. Therefore, SU system 3A can perform wireless communication using allowable maximum transmission power $P(\theta)$ in each transmission direction θ to the extent of not giving interference of the allowable interference level to first border B1 of each of PU systems PU3 and PU4 when a transmission signal is sent from communication area SU2 (for example, a central location). In other words, SU system 3A cannot acquire information (refer to Exemplary Embodiment 3) regarding each of PU systems PU3 and PU4 from shared frequency management apparatus 2, but can send a transmission signal with transmission power to the extent of not giving interference to each of PU systems PU3 and PU4. For example, SU system 3A can spuriously enlarge a size of an area of second border B2 from region BFB2 to region AFB2 (refer to FIG. 11).

SU system 3A calculates a wireless parameter (for example, an MCS value) corresponding to a radio resource by using an added SINR obtained by adding the difference (that is, "allowable maximum transmission power $P(\theta)$ −minimum allowable maximum transmission power $P(\theta 0)$") to an SINR between base station 351 and a terminal, and channel state information reported from the terminal. SU system 3A allocates a radio resource to a terminal on the basis of a ratio between an MCS value based on the latest channel state information in the terminal and an average value of MCS values based on average channel state information corresponding to a predetermined past time in the terminal. Consequently, SU system 3A can efficiently allocate a radio resource to a terminal while reducing an interference area given to PU systems PU3 and PU4 in light of channel state information of a downlink (DL) between base station 351 and the terminal and also satisfying the fairness of allocation of a radio resource among individual terminals such that the maximization of throughput is expected.

Sharing conditions (for example, shared frequency use conditions) include a carrier frequency, a bandwidth, and allowable maximum transmission power $P(\theta)$ as a function of transmission direction θ calculated to the extent of minimizing interference given to PU systems PU3 and PU4. Consequently, SU system 3A is not notified of information indicating a physical position of each of PU systems PU3 and PU4, but can select a wireless parameter (refer to the above description) for minimizing interference given to each of PU systems PU3 and PU4 and can thus stably perform wireless communication using a shared frequency in communication area SU2.

As mentioned above, the exemplary embodiments have been described with reference to the accompanying drawings, but the present disclosure is not limited to these embodiments. It is obvious that a person skilled in the art can conceive of various changes, modifications, replacements, additions, deletions, and equivalents within the category disclosed in the claims, and it is understood that they are also included in the technical scope of the present disclosure.

Any combination of the respective constituent elements in the exemplary embodiments may occur within the scope without departing from the concept of the invention.

In Exemplary Embodiment 2, a radio wave sensor provided around third border B3 of SU system 3 has two functions such as a function of creating in advance a table (refer to FIG. 8) indicating a correspondence relationship between a beam direction of a wireless signal (radio wave) transmitted from each of base stations 35I to 35k and a reception level (reception power) at each position around third border B3, and a function of enabling SU system 3 to monitor that SU system 3 observes a shared frequency use condition of which a notification is sent from shared frequency management apparatus 2, during an operation. A plurality of radio wave sensors are not necessarily required to be used simultaneously in creating the table (refer to FIG. 8), and a reception level may be measured in each beam direction while moving and providing at least one radio wave sensor (for example, radio wave sensor WS1) to and at each position. A plurality of radio wave sensors (for example, radio wave sensors WS1 to WS5) may be provided at a plurality of positions around third border B3 during an operation, but a position where a reception level is highest in a radio wave sensor may be specified, and only one radio wave sensor (for example, radio wave sensor WS1) may be provided at the position (for example, an application of using a shared frequency is performed by using the highest reception level). With this configuration, SU system 3 can also monitor and observe the maximum value of a radio wave radiated to the outside of third border B3.

For example, first border B1 or second border B2 has been described to be defined as a border of a position where reception power becomes a reception sensitivity of PU system 1 or 1A, but it is also included in the technical scope of the present disclosure that first border B1 or second border B2 is defined as a border of a position where reception power becomes a value 10 dB smaller than a reception sensitivity of PU system 1 or 1A, and thus an interference margin of 10 dB is obtained.

The present disclosure is useful as a wireless system capable of using a shared frequency, a radio resource allocation method in wireless communication using a shared frequency, and a base station, capable of suppressing a reduction of use efficiency of a shared frequency by adaptively controlling transmission power according to a direction of wireless communication when at least some shared frequencies preferentially usable by a PU system are used by a SU system.

What is claimed is:

1. A wireless system capable of using a shared frequency mainly used by an existing first wireless system under predetermined sharing conditions, the wireless system comprising:
    a communicator that performs wireless communication with at least one terminal accommodated in a communication area of the wireless system;
    at least one sensor that is disposed around the communication area and measures reception power of a signal sent from the inside of the communication area via the communicator;
    a memory that stores beam data indicating a correspondence relationship between a beam direction of the signal and a measurement result in the sensor;
    a determiner that determines allowable maximum transmission power of the signal in each beam direction on the basis of the sharing conditions and the beam data; and
    an allocator that allocates a radio resource to the terminal on the basis of the allowable maximum transmission power in each beam direction and channel state information reported from the terminal.

2. The wireless system of claim 1, further comprising:
    an acquirer that acquires the sharing conditions including allowable transmission power of the signal calculated to the extent of avoiding interference with the first wireless system from a shared frequency management apparatus connected to the first wireless system,
    wherein the determiner determines the allowable maximum transmission power in each beam direction on the basis of the allowable transmission power and the beam data.

3. The wireless system of claim 1,
    wherein the communicator receives the channel state information in each beam direction of the signal from the terminal, and
    wherein the allocator allocates the radio resource to the terminal on the basis of the allowable maximum transmission power in each beam direction, and the channel state information in each beam direction reported from the terminal.

4. The wireless system of claim 1,
    wherein the allocator calculates a wireless parameter corresponding to the radio resource by using the allowable maximum transmission power in each beam direction and the channel state information reported from the terminal, and allocates the radio resource to the terminal on the basis of a ratio between the wireless parameter based on the latest channel state information in the terminal and the wireless parameter based on average channel state information corresponding to a predetermined past time in the terminal.

5. The wireless system of any one of claim 1,
    wherein the sharing conditions include a carrier frequency, a bandwidth, and allowable maximum reception power of a signal in the sensor, calculated to the extent of minimizing interference given to the first wireless system.

6. A radio resource allocation method in wireless communication of a wireless system capable of using a shared frequency mainly used by an existing first wireless system under predetermined sharing conditions, the method comprising:
    performing wireless communication with at least one terminal accommodated in a communication area of the wireless system;
    causing at least one sensor disposed around the communication area to measure reception power of a signal sent from the inside of the communication area;
    storing, into a memory, beam data indicating a correspondence relationship between a beam direction of the signal and a measurement result in the sensor;
    determining allowable maximum transmission power of the signal in each beam direction on the basis of the sharing conditions and the beam data; and
    allocating a radio resource to the terminal on the basis of the allowable maximum transmission power in each beam direction and channel state information reported from the terminal.

7. A base station in a wireless system capable of using a shared frequency mainly used by an existing first wireless system under predetermined sharing conditions, the base station comprising:

a communicator that performs wireless communication with at least one terminal accommodated in a communication area of the wireless system;

a memory that stores beam data indicating a correspondence relationship between a measurement result of reception power of a signal sent from the inside of the communication area via the communicator by at least one sensor disposed around the communication area and a beam direction of the signal;

a determiner that determines allowable maximum transmission power of the signal in each beam direction on the basis of the sharing conditions and the beam data; and an allocator that allocates a radio resource to the terminal on the basis of the allowable maximum transmission power in each beam direction and channel state information reported from the terminal.

* * * * *